(12) United States Patent
Sakiya

(10) Patent No.: US 7,425,783 B2
(45) Date of Patent: Sep. 16, 2008

(54) LINEAR MOTOR

(75) Inventor: Fumio Sakiya, Hiroshima (JP)

(73) Assignee: Rorze Corporation, Fukayasu-gun, Hiroshima (JP)

( * ) Notice: Subject to any disclaimer, the term of this patent is extended or adjusted under 35 U.S.C. 154(b) by 373 days.

(21) Appl. No.: 10/570,762

(22) PCT Filed: Sep. 8, 2003

(86) PCT No.: PCT/JP03/11430

§ 371 (c)(1),
(2), (4) Date: Mar. 7, 2006

(87) PCT Pub. No.: WO2005/027323

PCT Pub. Date: Mar. 24, 2005

(65) Prior Publication Data

US 2007/0035184 A1    Feb. 15, 2007

(51) Int. Cl.
*H02K 41/03* (2006.01)
*H02K 3/28* (2006.01)
(52) U.S. Cl. ......................................... 310/12; 310/184
(58) Field of Classification Search ................... 310/12, 310/13, 15, 179, 180, 184
See application file for complete search history.

(56) References Cited

U.S. PATENT DOCUMENTS 5,208,496 A * 5/1993 Tozoni et al. ................. 310/12
2004/0251764 A1* 12/2004 Groening .................... 310/184
2006/0244332 A1* 11/2006 Wyremba .................... 310/179

FOREIGN PATENT DOCUMENTS

| JP | 61076060 A | * | 4/1986 |
| JP | 61210864 A | * | 9/1986 |
| JP | 5-219786 | | 8/1993 |
| JP | 6-54516 | | 2/1994 |

(Continued)

*Primary Examiner*—Tran Nguyen
(74) *Attorney, Agent, or Firm*—McGinn IP Law Group, PLLC

(57) ABSTRACT

A stator portion of a linear motor includes a U-phase coil portion (10U), a V-phase coil portion (10V), and a W-phase coil portion (10W) through which currents with phases different by 120 degrees from one another flow. Each coil portion has pairs of a first coil wound clockwise and a second coil wound counterclockwise. The pairs of coils adjoin to each other in the moving direction and are connected in series and arrayed in the moving direction. When the extension length from the first coil to the second coil is 360 degrees, the V-phase coil portion overlaps with and is shifted from the U-phase coil portion by 120 degrees, and the W-phase coil portion overlaps with and is shifted from the V-phase coil portion by 120 degrees with respect to the moving direction. A magnet portion (30) is movably combined with the U-phase, V-phase, and W-phase coil portions. The length of the magnet portion in the moving direction is less than a half of the wavelength of the magnetic flux generated with the coils. On a movable portion, a Hall element (40) is mounted at the position away from the center of the magnet portion by an integral multiple of a half of the wavelength of the magnetic flux generated with the coils. Depending on the output from the Hall element, the amplitude or phase of the current fed to each coil portion is controlled.

8 Claims, 17 Drawing Sheets

FOREIGN PATENT DOCUMENTS

| | | |
|---|---|---|
| JP | 6-165471 | 6/1994 |
| JP | 10-23735 | 1/1998 |
| JP | 10-174420 | 6/1998 |
| JP | 2000333434 A * | 11/2000 |
| JP | 2000-341931 | 12/2000 |
| JP | 2001-197718 | 7/2001 |
| JP | 2002-291220 | 10/2002 |

* cited by examiner

LINEAR MOTOR

TECHNICAL FIELD

This invention relates to a moving magnet type linear motor.

BACKGROUND ART

As is well known, a linear motor comprises a stator portion and a mover portion. Normally, the stator portion is configured by disposing a plurality of permanent magnets (hereinafter referred to as magnets) or electric magnets (hereinafter referred to as electromagnets) side by side in a moving direction. On the other hand, the mover portion comprises a coil and is configured so as to be movably combined with the magnets with a gap defined therebetween. It is necessary that the coil be supplied with electric power corresponding to the weight of the mover portion and the weight of a load mounted on the mover portion and it is necessary to supply the electric power to the moving coil through wiring. Therefore, appropriate measures are required for the wiring between the mover portion and the stator portion. If a battery is installed on the mover portion for power feeding to the coil, it is possible to eliminate the wiring between the mover portion and the stator portion. In this case, however, long-term traveling is not possible.

Further, the linear motor comprising the coil as the mover portion has a problem of heat generation in the coil. That is, various measures are required for cooling the generated heat of the moving coil.

For solving the foregoing problems, there is also proposed a moving magnet type linear motor using a magnet as a mover portion. The linear motor of this type comprises a stator portion having a plurality of coils arranged side by side in series in a moving direction. The mover portion has one or more magnets and is configured so as to be movably combined with the coils with a gap defined therebetween (see, e.g. Japanese Unexamined Patent Application Publication (JP-A) No. H6-54516).

On the other hand, the linear motor requires a position detecting device for stopping the mover portion at a predetermined position. In the hitherto linear motor, a linear scale is disposed on the stator portion along the moving direction and a magnetic sensor is provided on the mover portion so as to face the linear scale, thereby detecting the position of the mover portion. That is, the position of the mover portion is detected by the position detecting device in the combination of the linear scale and the magnetic sensor. By controlling the current to the coils based on detected values of the position detecting device, running control and position control of the mover portion are executed.

However, the linear scale is not low-priced and there are problems caused by the linear scale, such as an increase in cost of parts, an increase in cost of operation for installing the linear scale, and an increase in cost of maintenance.

It is therefore an object of this invention to provide a moving magnet type linear motor that enables running control without a linear scale.

It is another object of this invention to provide a moving magnet type linear motor that enables position control without a linear scale.

DISCLOSURE OF THE INVENTION

A linear motor according to this invention comprises a stator portion having coil portions fixedly arranged in series in a moving direction and a mover portion having one or more magnets and combined so as to be movable in the moving direction due to interaction with magnetic flux generated with the coil portions.

According to a first aspect of this invention, the stator portion has, as the coil portions, coil portions of N phases (N is an integer of 3 or more) to be fed with currents having a phase difference from one another. The coil portion of each phase has, as each pair, a first coil wound clockwise and a second coil wound counterclockwise, wherein the first and second coils in each pair are arranged adjacent to each other in the moving direction and connected in series and the plurality of pairs of the first and second coils are arrayed in the moving direction. Given that the extending length of the first coil and the second coil is set to 360 degrees, the coil portion of the second phase is disposed so as to shift in the moving direction by (360/N) degrees with respect to the coil portion of the first phase, the coil portion of the third phase is disposed so as to shift in the moving direction by (360/N) degrees with respect to the coil portion of the second phase, and the coil portion of the N-th phase is disposed so as to shift in the moving direction by (360/N) degrees with respect to the coil portion of the (N−1)-th phase, the coil portions of the N phases being disposed so as to be layered together. The magnet is combined with the coil portions of the N phases. The length of the magnet in the moving direction is set to half or less of a wavelength of the magnetic flux generated with the coils. A first magnetoelectric conversion element is attached to the mover portion at a position away from the center of the magnet in the moving direction by a predetermined distance. The currents to the respective coil portions are controlled based on an output of the first magnetoelectric conversion element.

According to a second aspect of this invention, the stator portion has, as the coil portions, an A-phase coil portion and a B-phase coil portion to be fed with currents having a phase difference of 90 degrees. The coil portion of each phase has, as each pair, a first coil wound clockwise and a second coil wound counterclockwise, wherein the first and second coils in each pair are arranged adjacent to each other in the moving direction and connected in series and the plurality of pairs of the first and second coils are arrayed in the moving direction. Given that the extending length of the first coil and the second coil is set to 360 degrees, the B-phase coil portion is disposed so as to shift in the moving direction by 90 degrees with respect to the A-phase coil portion and to be layered to the A-phase coil portion. The magnet is combined with the A-phase and B-phase coil portions. The length of the magnet in the moving direction is set to half or less of a wavelength of magnetic flux generated with the coils. A first magnetoelectric conversion element is attached to the mover portion at a position away from the center of the magnet in the moving direction by a predetermined distance. The currents to the respective coil portions are controlled based on an output of the first magnetoelectric conversion element.

In either of the first and second aspects, the coil portions are disposed so that a layering direction of the phases is set equal to a generating direction of the magnetic flux and the magnet has a generally inverted-U shape and is combined so as to straddle the layered coil portions. Accordingly, one magnetic pole of the magnet faces one of both side surfaces of the layered coil portions with a gap defined therebetween, while the other magnetic pole of the magnet faces the other of both side surfaces of the layered coil portions with a gap defined therebetween.

In either of the first and second aspects, when providing two or more magnets, it is preferable that the two or more magnets be provided side by side in the moving direction so that different magnetic poles are adjacent to each other.

In either of the first and second aspects, it is preferable that a detection signal of the first magnetoelectric conversion element be transmitted to a receiver provided on a stationary side in the form of a radio signal or an optical signal.

In either of the first and second aspects, it is preferable that the predetermined distance between the center of the magnet and the first magnetoelectric conversion element be set to a value of an integral multiple of a half wavelength of the magnetic flux generated with the coils.

In either of the first and second aspects, at least one second magnetoelectric conversion element may be further attached to the mover portion on a line connecting the center of the magnet and the first magnetoelectric conversion element and at a position different from that of the first magnetoelectric conversion element. In this case, a distance between the first magnetoelectric conversion element and the second magnetoelectric conversion element is set to a value of a quarter wavelength of the magnetic flux generated with the coils. Detection signals of the first magnetoelectric conversion element and the second magnetoelectric conversion element are transmitted to the receiver provided on the stationary side in the form of radio signals or optical signals. Further, it is preferable that a control unit be provided which performs position control of the mover portion in response to the detection signals of the first magnetoelectric conversion element and the second magnetoelectric conversion element received at the receiver.

BEST MODE FOR CARRYING OUT THE INVENTION

Figure 1:
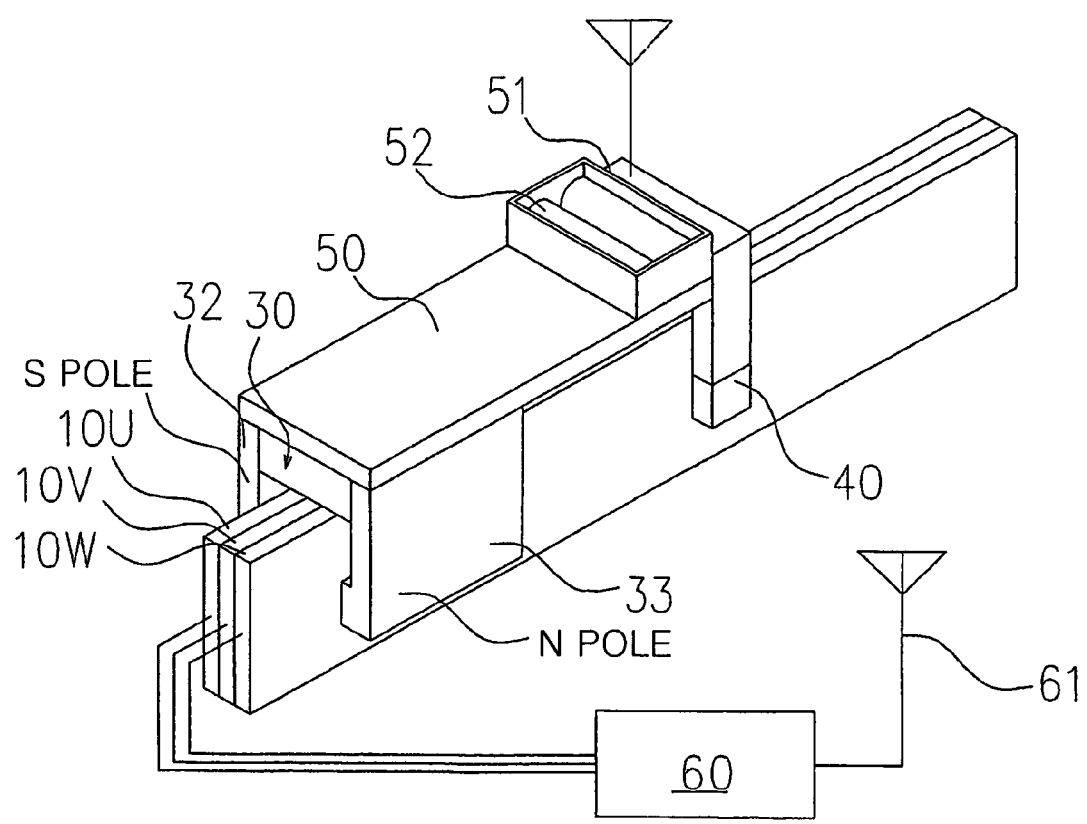
FIG. 1 is a diagram showing a schematic structure of a first embodiment of a linear motor according to this invention and its control system.

At first, the driving principle of a linear motor according to this invention will be briefly described with reference to FIG. 17. The linear motor applied with this invention is of the moving magnet type, wherein a rectangular coil 100 is fixed on an installation surface of a stationary portion 200. Particularly, the coil 100 is stood upright so that its magnetic flux generating direction becomes parallel to the installation surface. In other words, the coil 100 is stood upright so that two of its four sides become perpendicular to the installation surface.

On the other hand, a magnet portion 300 comprises a permanent magnet body (hereinafter referred to as a magnet body) 301 and yoke portions 302 and 303 extending vertically downward from both magnetic pole ends of the magnet body and has a generally inverted-U shape. Herein, the yoke portion 302 is an S pole while the yoke portion 303 is an N pole, and magnetic pole surfaces of the S and N poles face the coil 100 with gaps defined therebetween, respectively. It is assumed that the magnet portion 300 is freely movable in directions indicated by arrows 305 through a non-illustrated support portion. The length of the magnet portion 300 in the moving direction is set to an extending length of the single coil 100 or less in the moving direction.

Herein, let a current flow in the coil 100 in directions indicated by arrows. In this case, the current flowing along the vertical side, between the yoke portions 302 and 303, of the four sides of the coil 100 interacts with a magnetic flux between the yoke portions 302 and 303 so that a rightward driving force acts on the coil 100 in FIG. 17 according to the Fleming's left-hand rule. However, since the coil 100 is fixed, the movable magnet portion 300 moves leftward in FIG. 17. Note that driving forces generated at the two sides of the coil 100 parallel to the installation surface cancel each other.

Figure 17:
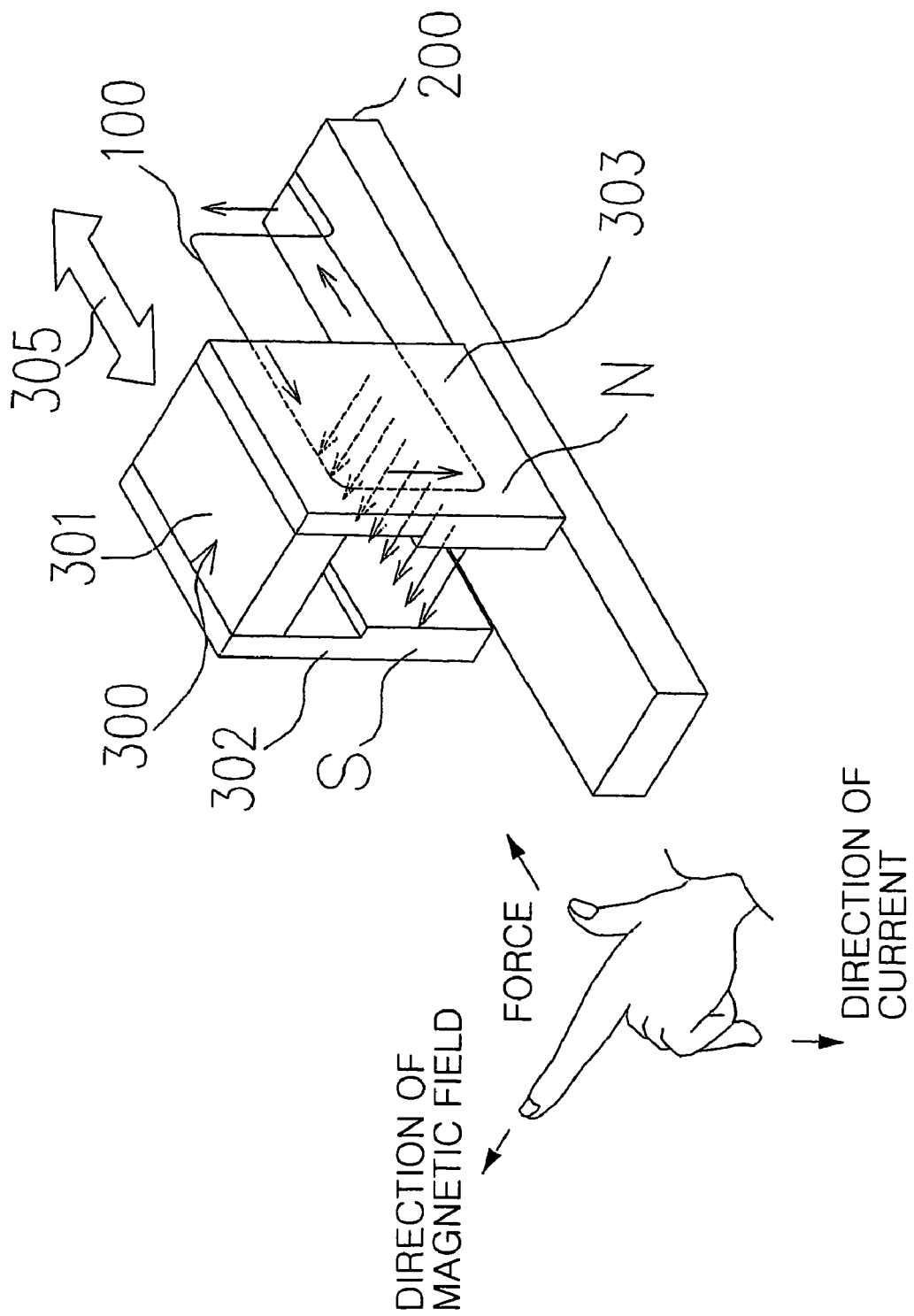
FIG. 17 is a diagram for explaining an operation principle of a linear motor.

FIG. 17 shows only the single coil 100 for simplification of description, but the linear motor according to this invention uses three-phase or two-phase coils. Hereinbelow, as a first embodiment of this invention, description will be made about the case where the three-phase coils are used.

Figure 2:
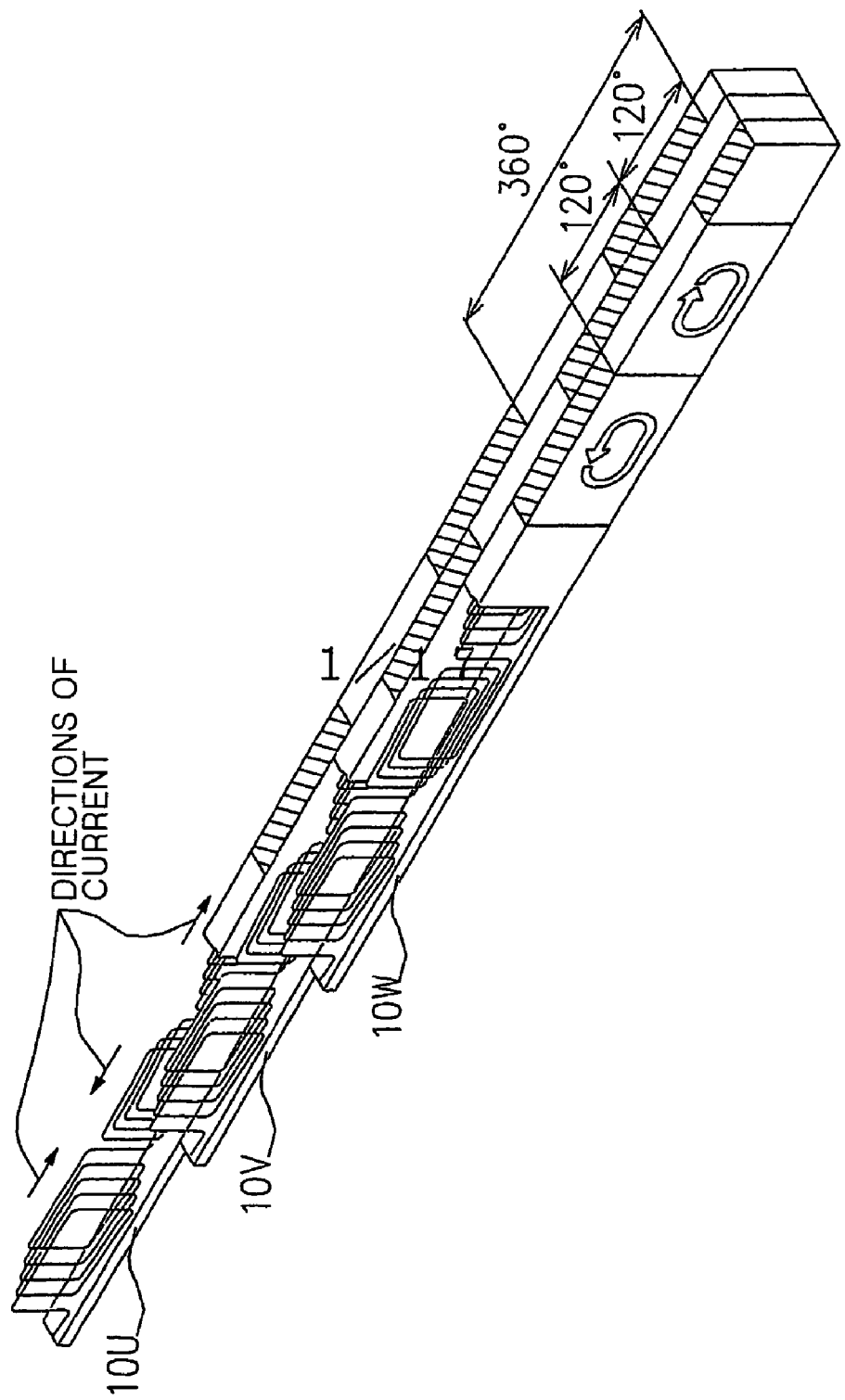
FIG. 2 is a diagram for explaining coil portions of three phases when this invention is applied to a three-phase linear motor.

Referring to FIG. 2, three-phase coil portions have a U-phase coil portion 10U, a V-phase coil portion 10V, and a W-phase coil portion 10W. At first, the U-phase coil portion 10U will be described. The U-phase coil portion 10U has, as each pair, a first rectangular coil wound clockwise a plurality of times and a second rectangular coil wound counterclockwise a plurality of times. These coils in each pair are arranged adjacent to each other in a moving direction of a mover portion and connected in series. Further, the plurality of pairs of coils are arrayed in the moving direction and connected in series. Hereinafter, the moving direction of the mover portion will be referred to simply as the moving direction. The U-phase coil portion 10U is stood upright so that its magnetic flux generating direction becomes perpendicular to the moving direction and parallel to an installation surface. In other words, it is stood upright so that two of four sides of each rectangular coil become perpendicular to the installation surface. Herein, it is given that the extending length of each pair of coils is 360 degrees [$2\pi$(rad)].

The V-phase coil portion 10V and the W-phase coil portion 10W are formed like the U-phase coil portion 10U. The V-phase coil portion 10V is disposed so as to shift from the U-phase coil portion 10U by 120 degrees [$2\pi/3$ (rad)]. The W-phase coil portion 10W is disposed so as to shift from the V-phase coil portion 10V by 120 degrees. Further, the U-phase coil portion 10U, the V-phase coil portion 10V, and the W-phase coil portion 10W are layered together. The layering direction is set to the magnetic flux generating direction, i.e. the direction perpendicular to the moving direction and parallel to the installation surface.

As described above, the three-phase coils have the structure in which the U-phase coil portion 10U, the V-phase coil portion 10V disposed so as to shift from the U-phase coil portion 10U by 120 degrees, and the W-phase coil portion 10W disposed so as to shift from the U-phase coil portion 10U by 240 degrees are layered together. Accordingly, by feeding currents with a phase shift of 120 degrees from one another to the U-phase coil portion 10U, the V-phase coil portion 10V, and the W-phase coil portion 10W, respectively, magnetic fluxes are generated in the same direction.

Each coil may be a so-called completely air-cored coil formed by a wire that is concentrically multi-wound.

Figure 3:
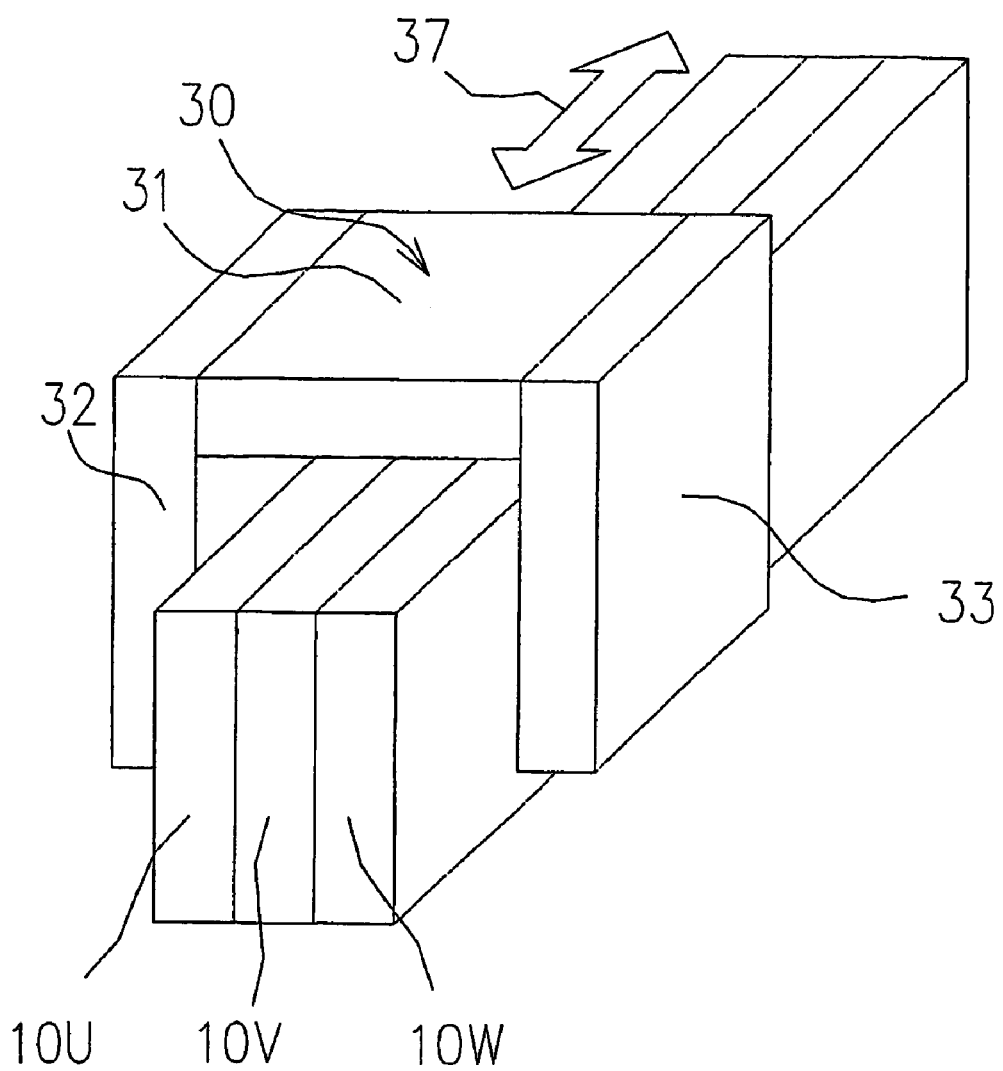
FIG. 3 is a diagram showing a relationship between the coil portions and a magnet portion in the three-phase linear motor according to this invention.

Referring to FIG. 3, a magnet portion 30 comprises a magnet body 31 and yoke portions 32 and 33 extending vertically downward from both magnetic pole ends of the magnet body and has a generally inverted-U shape. The magnet portion 30 may be entirely formed by a single magnet or may have a structure in which the yoke portions 32 and 33 are provided with magnets. In any case, the entire magnet portion 30 can be regarded as a single magnet. The magnet portion 30 is disposed so as to straddle the layered three-phase coils (hereinafter referred to as the layered coil portions). Herein, the yoke portion 32 is an S pole while the yoke portion 33 is an N pole, and the S and N poles face both side surfaces of the layered coil portions with gaps defined therebetween, respectively. As will be described later, the extending length of the magnet portion 30 in the moving direction is set to half or less of a wavelength of magnetic flux generated with the layered coil portions. Naturally, it is assumed that the magnet portion 30 is movable along guide portions in directions indicated by arrows 37 through a non-illustrated support portion.

Figure 4:
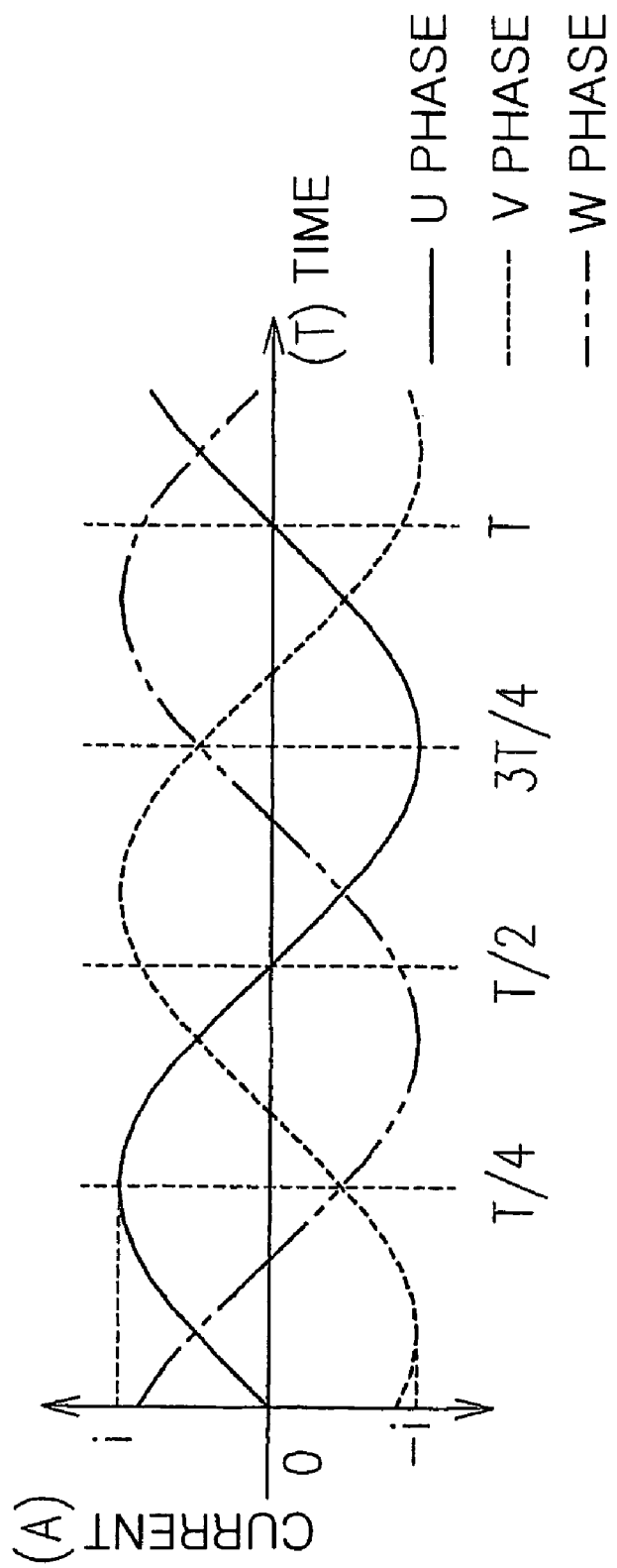
FIG. 4 is a waveform diagram showing one example of current waveforms supplied to the respective coil portions of the three-phase linear motor according to this invention.

The magnet portion 30 is movably combined with the layered coil portions as described above and AC currents with a phase difference of 120 degrees from one another are fed to the U-phase coil portion 10U, the V-phase coil portion 10V, and the W-phase coil portion 10W, respectively, as shown in FIG. 4. Then, by the magnetic flux from the magnet portion 30 and the currents flowing in the U-phase coil portion 10U, the V-phase coil portion 10V, and the W-phase coil portion 10W, particularly the currents flowing in the directions perpendicular to the installation surface, forces are generated therebetween.

Figure 5:
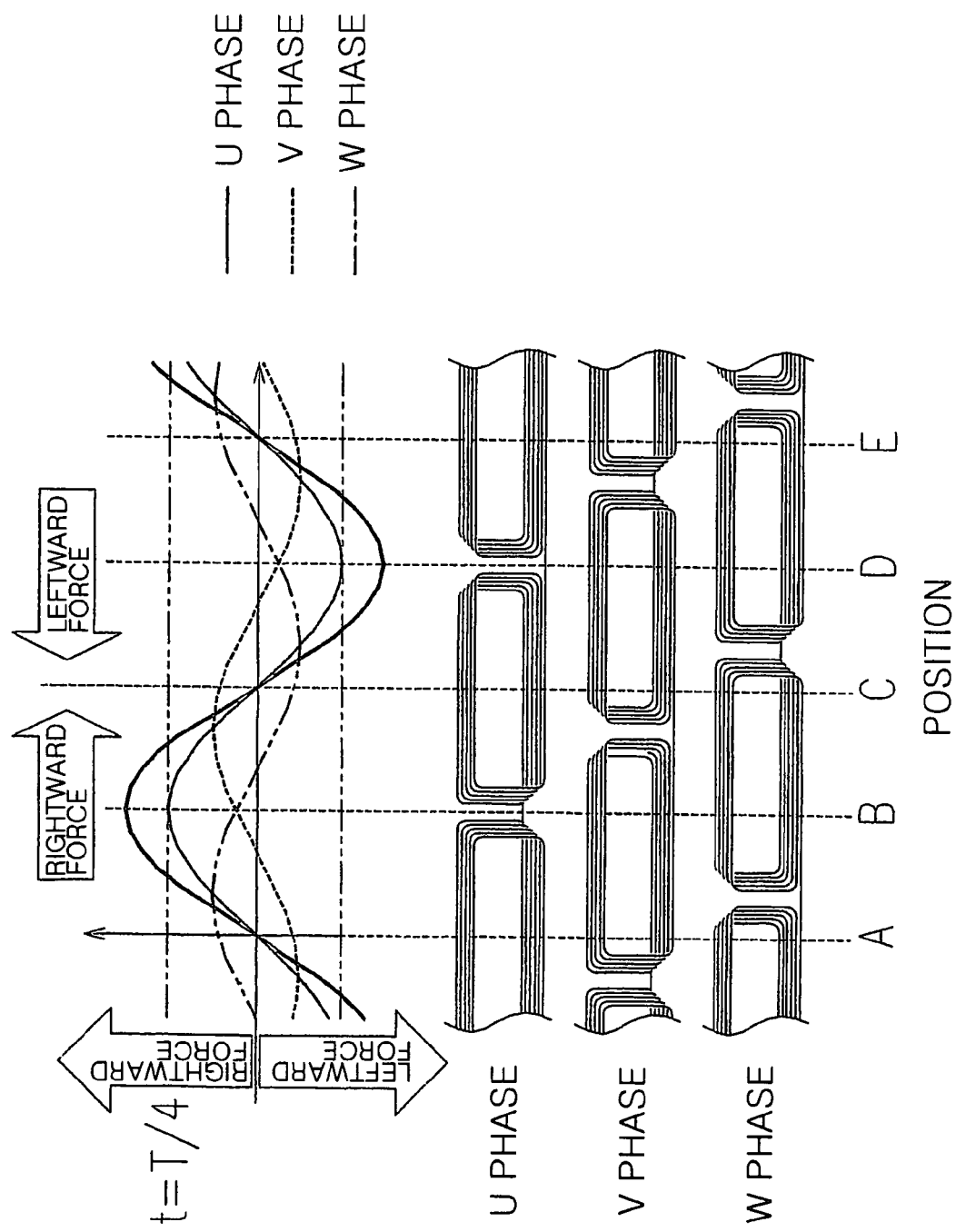
FIG. 5 is a diagram for explaining forces that act on the magnet portion due to the interaction between the coil portions of three phases and the magnet portion in the three-phase linear motor according to this invention.

FIG. 5 shows three forces acting on the magnet portion 30 by the U-phase, V-phase, and W-phase coil portions and a resultant force thereof at the timing of T/4 in FIG. 4. In FIG. 5, at position A, for example, the force acting on the magnet portion 30 by the U-phase coil portion 10U is zero, while the forces acting on the magnet portion 30 by the V-phase coil portion 10V and the W-phase coil portion 10W are mutually opposite in direction and equal in magnitude. Therefore, the resultant force of the foregoing three forces is zero. At position B, the force acting on the magnet portion 30 by the U-phase coil portion 10U is maximum, while the forces acting on the magnet portion 30 by the V-phase coil portion 10V and the W-phase coil portion 10W are equal in magnitude and, further, in the same direction. Therefore, the resultant force of the foregoing three forces is maximum. As a result, the force exerted on the magnet portion 30 is directed rightward in FIG. 5 between A-C while leftward in FIG. 5 between C-E.

Figure 6:
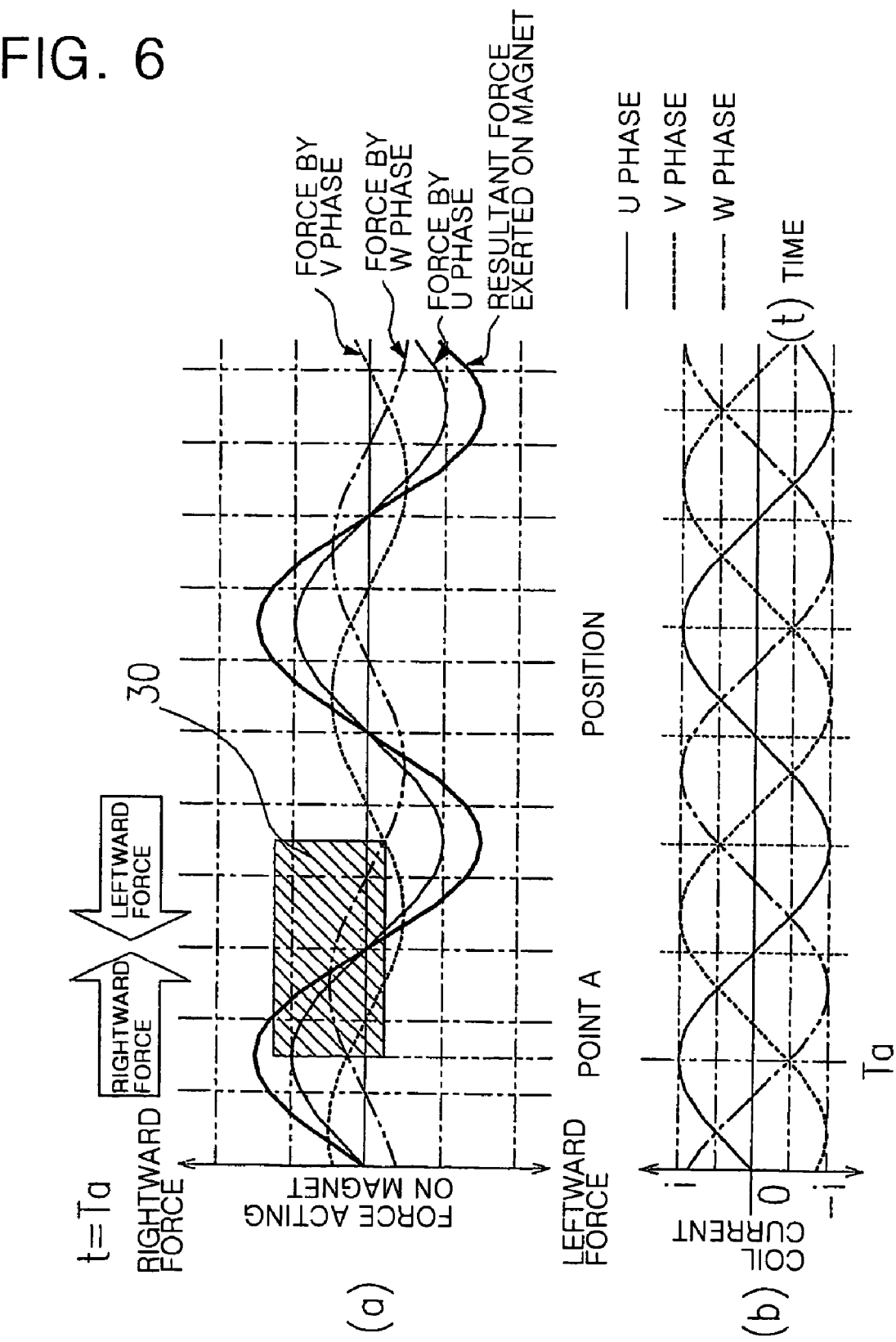
FIG. 6, (a) and FIG. 6, (b) are waveform diagrams for explaining a principle of movement of the magnet portion due to the interaction between the coil portions of three phases and the magnet portion in the three-phase linear motor according to this invention.
Figure 9:
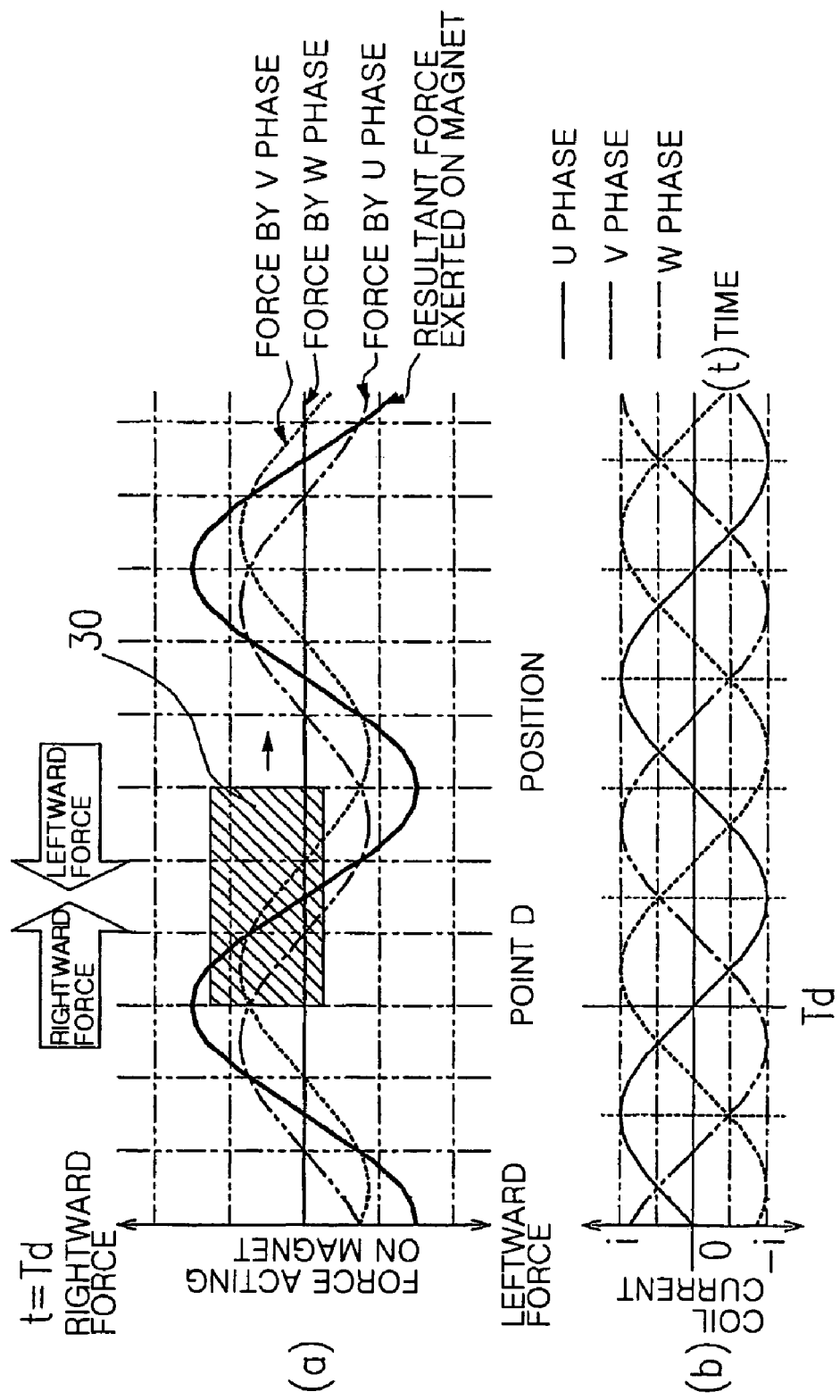
FIG. 9, (a) and FIG. 9, (b) are waveform diagrams for explaining a principle of movement of the magnet portion due to the interaction between the coil portions of three phases and the magnet portion in the three-phase linear motor according to this invention.

FIG. 6, (a) and (b) to FIG. 9, (a) and (b) sequentially show a principle of movement of the magnet portion 30 due to the interaction between the currents flowing in the three-phase layered coil portions and the magnet portion 30 as described above. It is assumed that the extending length of the magnet portion 30 is set to half the wavelength of the magnetic flux generatted with the coil portions.

Figure 7:
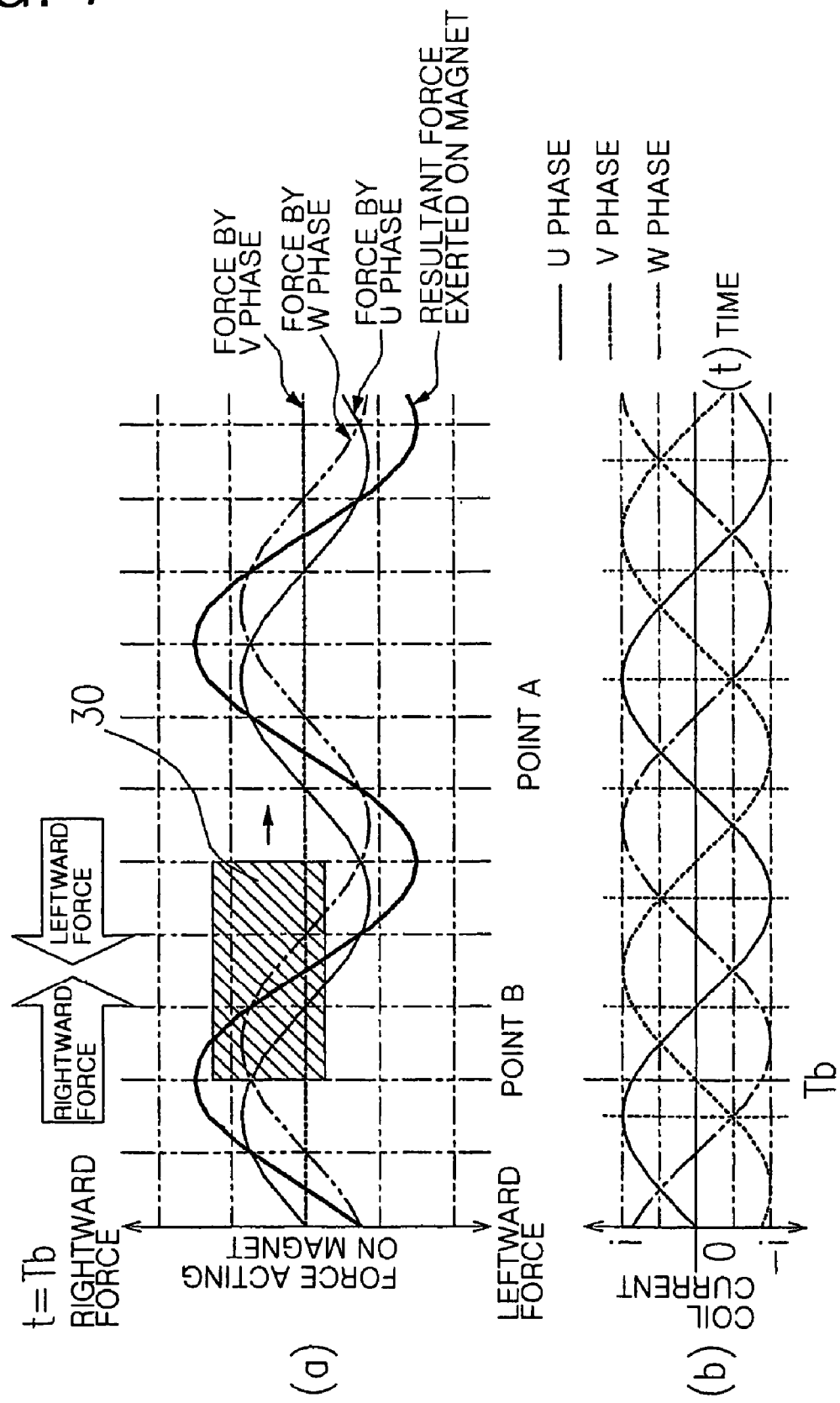
FIG. 7, (a) and FIG. 7, (b) are waveform diagrams for explaining a principle of movement of the magnet portion due to the interaction between the coil portions of three phases and the magnet portion in the three-phase linear motor according to this invention.
Figure 8:
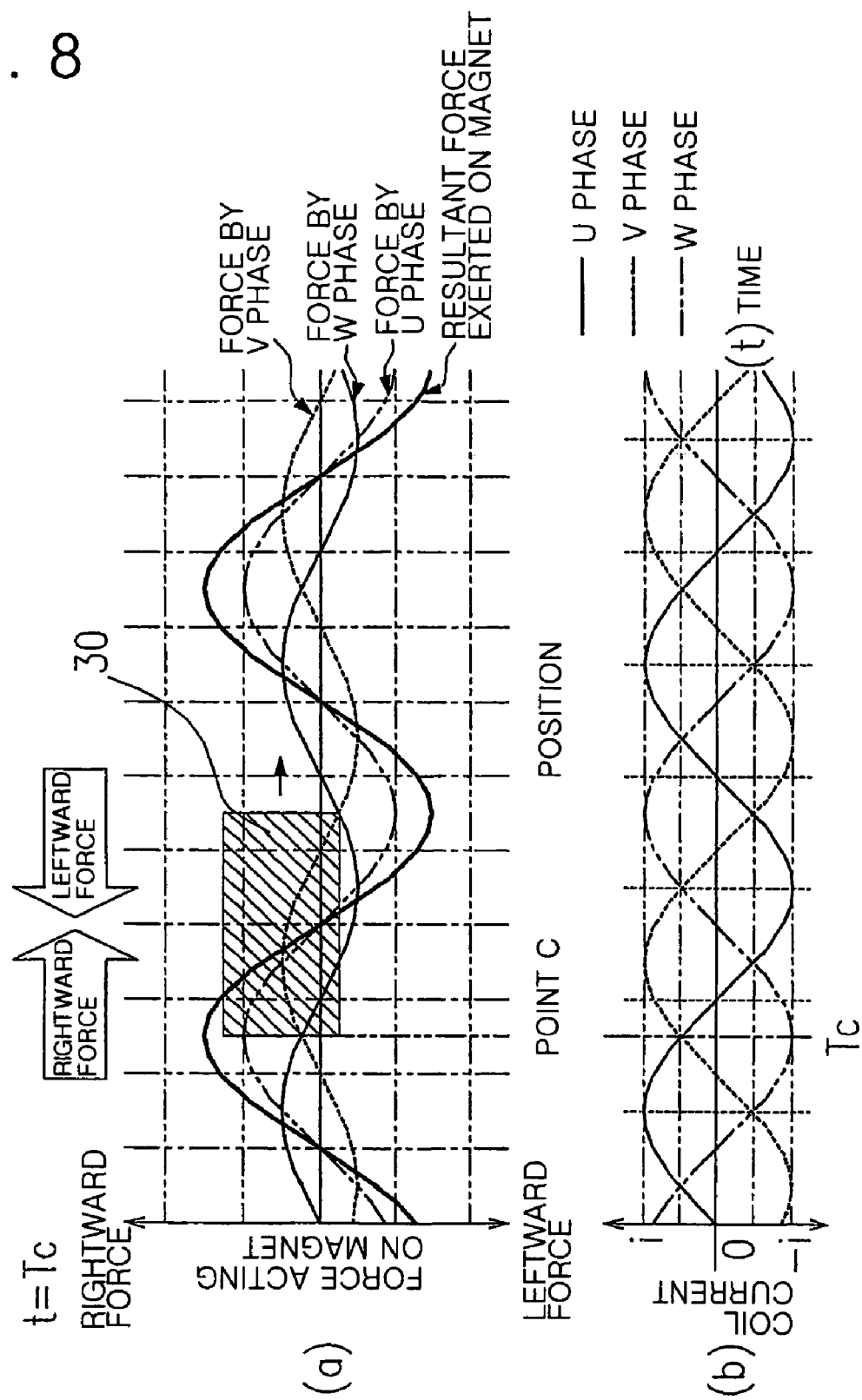
FIG. 8, (a) and FIG. 8, (b) are waveform diagrams for explaining a principle of movement of the magnet portion due to the interaction between the coil portions of three phases and the magnet portion in the three-phase linear motor according to this invention.

FIG. 6, (a), FIG. 7, (a), FIG. 8, (a), and FIG. 9, (a) each show waveforms of forces at a certain time, wherein the axis of abscissas represents the position with respect to the coils. A waveform of a force at a certain time may be considered the same as a waveform of a magnetic flux at the certain time. Therefore, later-described FIGS. 10 to 15 show waveforms of resultant magnetic fluxes. On the other hand, FIG. 6, (b), FIG. 7, (b), FIG. 8, (b), and FIG. 9, (b) each show current waveforms, wherein the axis of abscissas represents the time.

FIG. 6 shows three forces acting on the magnet portion 30 due to the interaction between the three-phase coil currents and the magnetic flux of the magnet portion 30 when the coil currents of the respective phases are at time instant Ta, i.e. when the U-phase current value is a maximum positive value and the V-phase and W-phase current values are an equal negative value, and a resultant force of those three forces.

FIG. 7 shows that, because of the coil currents of the respective phases having changed to values at time instant Tb, the maximum value of the resultant force has shifted from point A in FIG. 6, (a) to point B in FIG. 7, (a), i.e. rightward in FIG. 7, (a). Thus, the magnet portion 30 moves rightward in the figure.

FIG. 8 shows that, because of the coil currents of the respective phases having changed to values at time instant Tc, the maximum value of the resultant force has shifted from point B in FIG. 7, (a) to point C, rightward, in FIG. 8, (a). Thus, the magnet portion 30 further moves rightward in the figure.

FIG. 9 shows that, because of the coil currents of the respective phases having changed to values at time instant Td, the maximum value of the resultant force has shifted from point C in FIG. 8, (a) to point D, rightward, in FIG. 9, (a). Thus, the magnet portion 30 further moves rightward in the figure.

As described above, when the currents to the respective U-phase, V-phase, and W-phase coil portions change like Ta→Tb→Tc→Td, the movable magnet portion 30 moves in sequence like point A→point B→point C→point D following, i.e. synchronously with, changes in current due to the interaction between the currents flowing in the coil portions of the respective phases and the magnetic flux of the magnet portion 30.

The magnet portion 30 is movable as shown in FIGS. 6 to 9. However, when, for example, a large driving force is required due to an increase in load at the time of moving the magnet portion 30, there is a case where the magnet portion 30 cannot be accurately driven by the magnetic flux of the layered coil portions. In this case, it is unknown whether or not the magnet portion 30 is moving without delay with respect to the magnetic flux of the layered coil portions.

Figure 10:
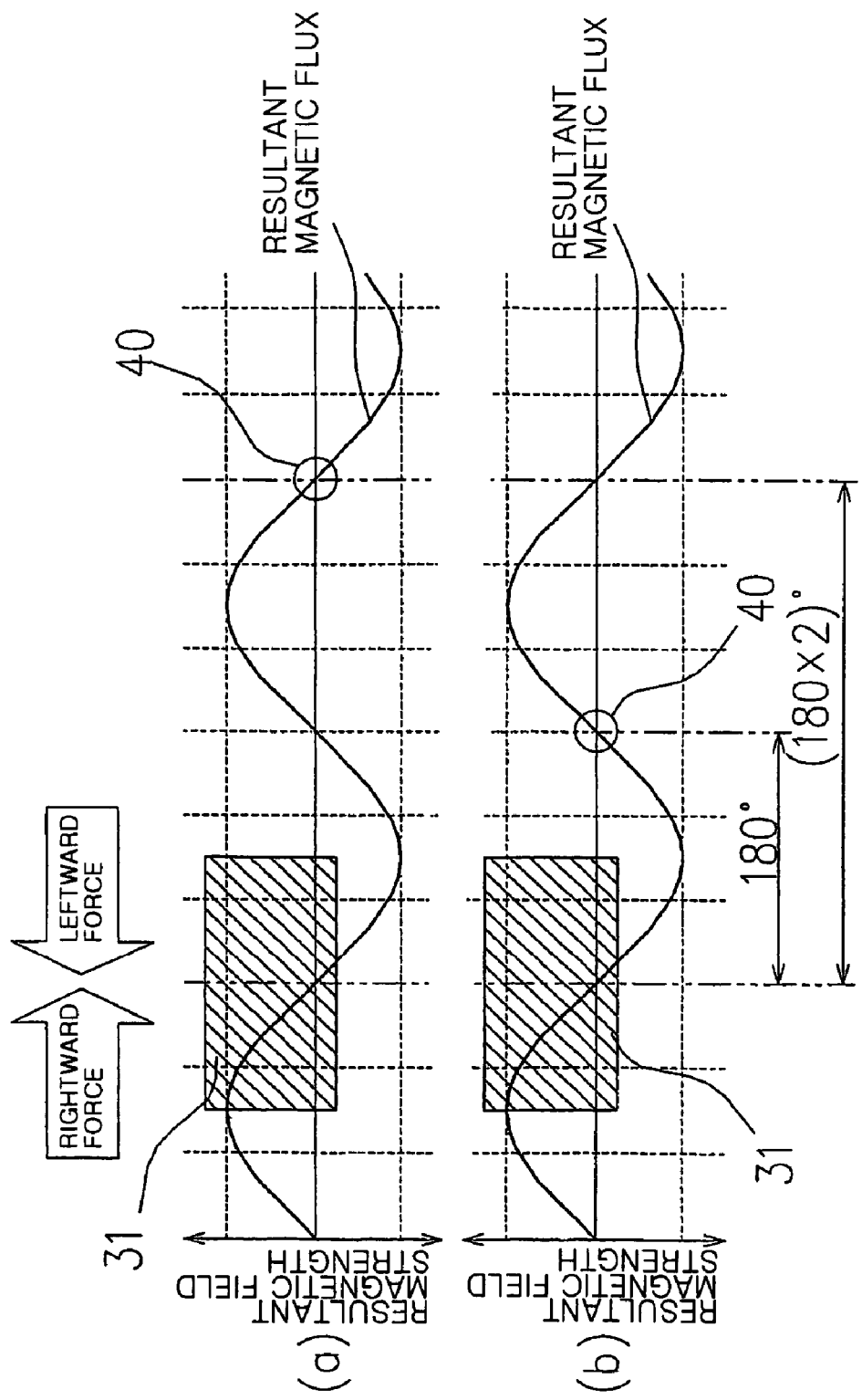
FIG. 10, (a) and FIG. 10, (b) are diagrams each for explaining a position of a Hall element provided in the three-phase linear motor according to this invention.

For solving this problem, as shown in FIG. 10, the linear motor according to this embodiment is provided with a Hall element (first Hall element) 40 as a magnetoelectric conversion element at the position away from the center of the magnet body 31 in the moving direction by a predetermined distance. The magnetoelectric conversion element is an element for converting a magnetic field strength into an electrical signal and there are known a Hall IC, a Hall element, a magnetoresistive element, and so on. Although any of those elements can be used in this invention, description will be made hereinbelow about the case where the Hall element is used.

FIG. 10, (a) and FIG. 10, (b) each show a resultant magnetic flux waveform of the three-phase layered coil portions. The Hall element 40 is for measuring the magnetic field strength and is movable along with the magnet body 31. The predetermined distance represents a portion spaced forward from the center of the magnet body 31 in the moving direction by an integral multiple of a half wavelength of the magnetic flux (resultant magnetic flux) of the layered coil portions in the state where the magnet body 31 is balanced with respect to lateral forces. Also herein, the extending length of the magnet body 31 in the moving direction is set to half the wavelength of the resultant magnetic flux generated with the layered coil portions.

FIG. 10, (a) shows an example where the Hall element 40 is attached at the portion spaced forward in the moving direction by twice the half wavelength of the magnetic flux of the layered coil portions. FIG. 10, (b) shows an example where the Hall element 40 is attached at the portion spaced forward in the moving direction by one time the half wavelength of the magnetic flux of the layered coil portions.

Figure 11:
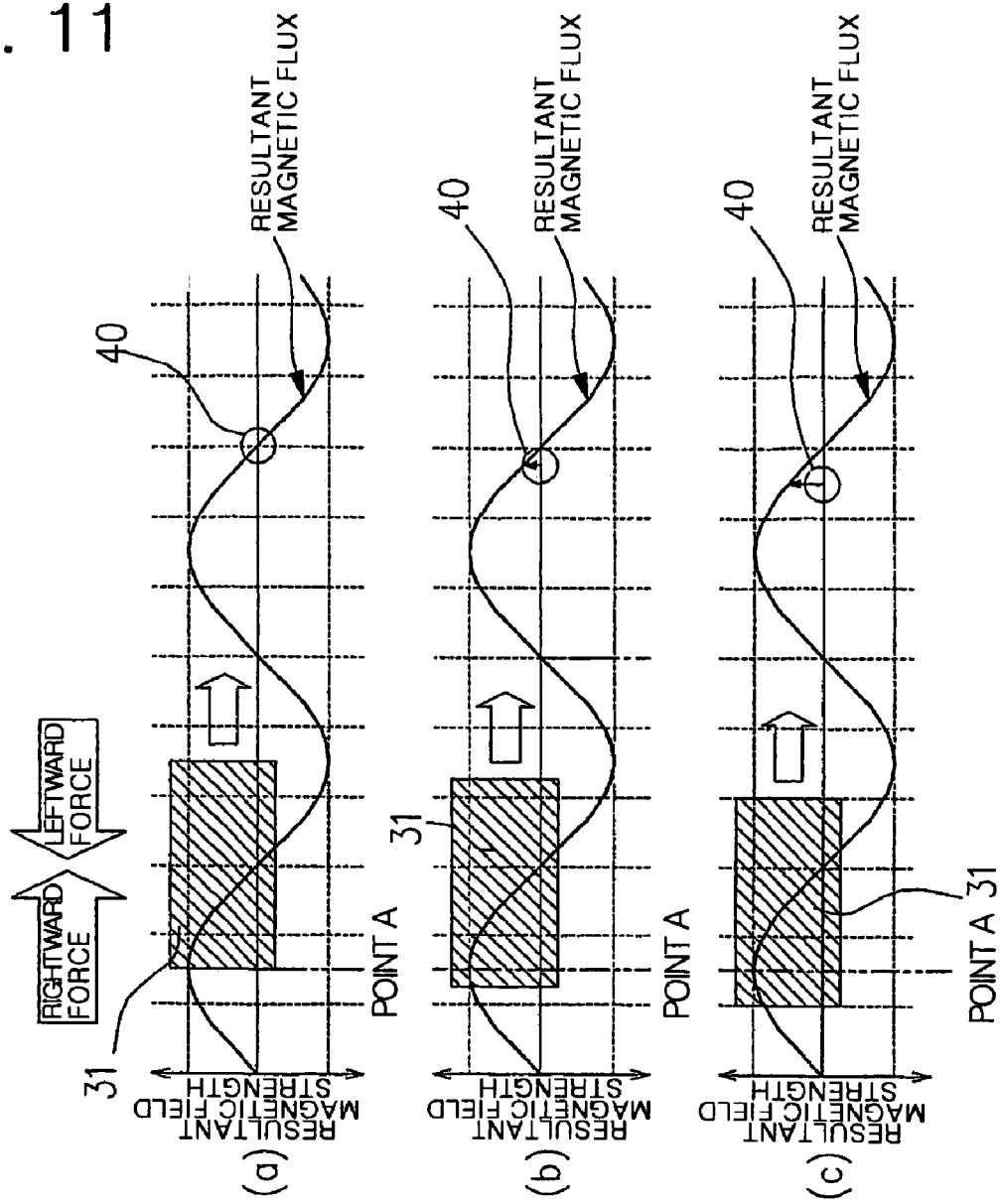
FIG. 11, (a) to FIG. 11, (c) are diagrams for explaining the function of the Hall element provided in the three-phase linear motor according to this invention.

The example of FIG. 10, (a) will be described. The magnetic field strength is measured by the Hall element 40 while the magnet body 31 is moving. In this case, as shown in FIG. 11, (a), when the center of the magnet body 31 is located at a position of the resultant magnetic field strength being zero, i.e. when it is moving in a synchronized state, the Hall element 40 is also located at a position of the resultant magnetic field strength being zero and therefore no output appears. However, as shown in FIG. 11, (b), when the magnet body 31 deviates from the synchronized state so as to be delayed in movement, the center of the magnet body 31 also deviates from the position of the resultant magnetic field strength being zero so that the Hall element 40 is located at a position slightly before the position of the resultant magnetic field strength being zero. As a result, the Hall element 40 produces an output (positive value) corresponding to the resultant magnetic field strength at that position. As shown in FIG. 11, (c), when the magnet portion 30 is further delayed in movement as compared with the case of FIG. 11, (b), the Hall element 40 is located at a position further before the case of FIG. 11, (b). As a result, the Hall element 40 produces a larger output as compared with the case of FIG. 11, (b). That is, when the magnet body 31 is delayed in movement like in FIG. 11, (b) or FIG. 11, (c) with respect to the magnetic flux (resultant magnetic flux) of the layered coil portions, the Hall element 40 produces a detection signal having a value corresponding to such a delay.

Figure 12:
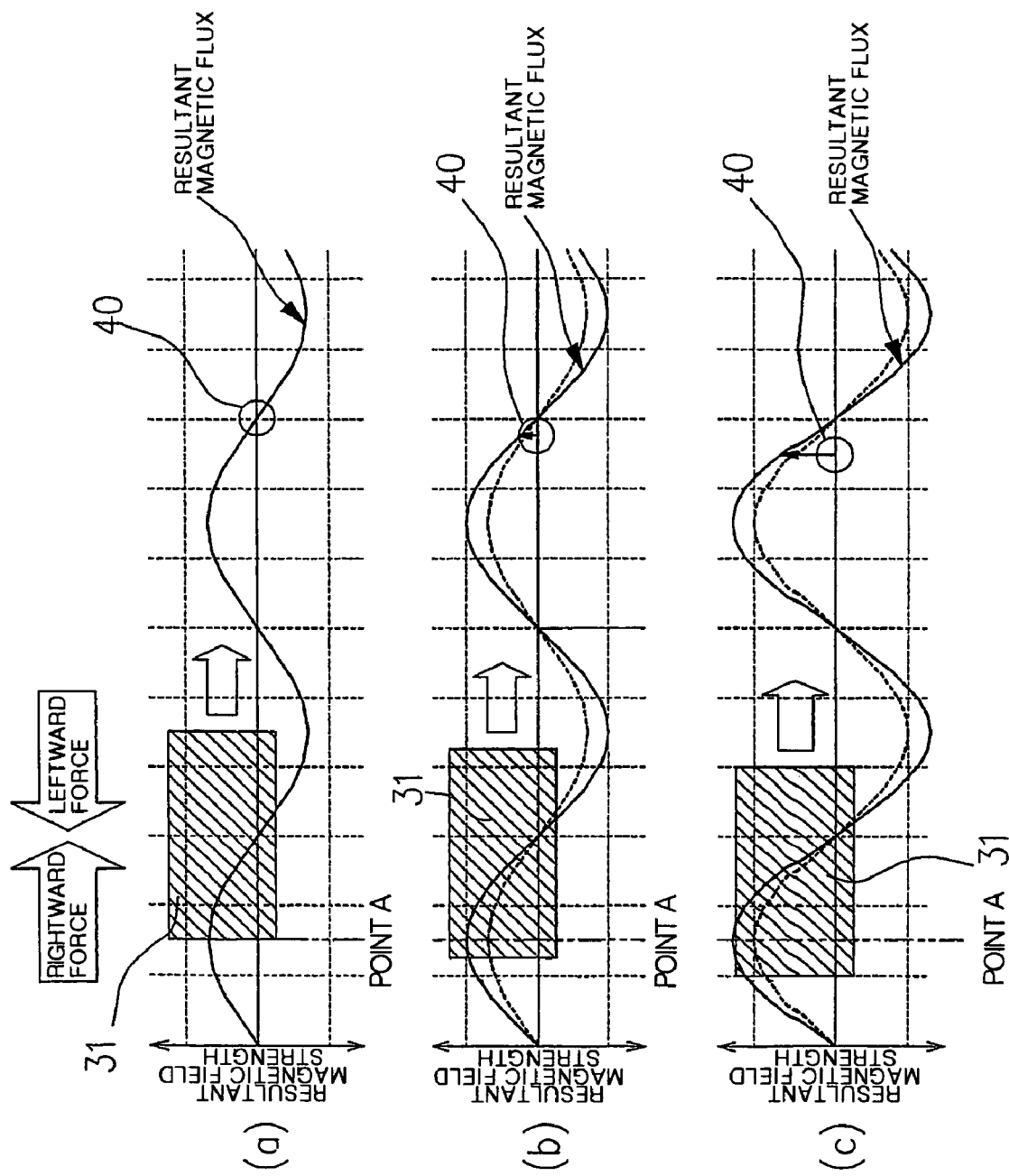
FIG. 12, (a) to FIG. 12, (c) are diagrams for explaining a case where amplitude control of coil currents is executed by the use of a detection signal of the Hall element provided in the three-phase linear motor according to this invention.

This detection signal is fed back to a later-described control unit. As shown in FIG. 12, the control unit increases the amplitude of the coil currents with respect to the delay of the magnet body 31, thereby performing running control of moving the magnet body 31 so as to securely follow the magnetic flux of the coil portions. Although not shown, running control of the magnet body 31 may be performed by shifting the phases of the coil currents depending on the delay of the magnet body 31.

The Hall element 40 produces a positive detection signal when the magnet body 31 is delayed, while, it produces a negative detection signal when the magnet body 31 is advanced. In this case, the control unit implements control operation of increasing the amplitude of the coil currents to strengthen a leftward force applied to the magnet body 31 or shifting the phases in the direction opposite to the above. The amplitude or phase control of the coil currents is carried out at the same ratio with respect to the three phases, respectively. In any case, the control unit performs the running control so that the center of the magnet body 31 is always located close to the position of the resultant magnetic field strength being zero during the running of the magnet body 31.

The example of FIG. 10, (b) differs from FIG. 10, (a) in the following points. At first, the position where the Hall element 40 is attached differs as described above. Accordingly, there is a difference in that when the center of the magnet body 31 is not located at the position of the resultant magnetic field strength being zero while the magnet portion 30 is moving, i.e. when the magnet portion 30 deviates from the synchronized state so as to be delayed in movement, the Hall element 40 produces an output having a negative value. The manner of FIG. 10, (b) other than these points is the same as that of FIG. 10, (a).

FIG. 1 is a structural diagram of the linear motor according to the first embodiment of this invention and its control system. The magnet portion 30 is attached to a slider 50. The slider 50 is supported (illustration of a support structure is omitted) so as to be movable in the extending direction of the layered coil portions composed of the U-phase coil portion 10U, the V-phase coil portion 10V, and the W-phase coil portion 10W. As described above, the Hall element 40 is attached to the slider 50 at its portion spaced forward from the center of the magnet body 31 in the moving direction by an integral multiple of the half wavelength of the magnetic flux (resultant magnetic flux) of the layered coil portions. Particularly, the Hall element 40 is disposed so as to face one of both side surfaces of the layered coil portions with a gap defined therebetween. For transmitting a detection signal from the Hall element 40 in the form of a radio signal, the slider 50 is mounted thereon with an oscillator 51 including an antenna, a battery 52 for ensuring the transmission power, and so on. Since the battery 52 is for obtaining the transmission power, it can be used for a long time even with a small capacity. The detection signal may be transmitted in the form of an optical signal.

On the other hand, the stationary side is provided with an antenna 61 for receiving the detection signal from the oscillator 51 and a control unit 60 that is connected to the antenna 61 and receives the detection signal from the antenna 61 so as to perform the running control of the movable portion by carrying out the foregoing amplitude or phase control of the currents supplied to the U-phase coil portion 10U, the V-phase coil portion 10V, and the W-phase coil portion 10W.

Note that the signal of the Hall element 40 can achieve the same effect by connecting between the slider 50 and the control unit 60 by wire, other than using radio or light. In this case, wiring for the detection signal requires only one channel having a signal line and a GND line and thus is not so difficult as opposed to a three-phase power cable for feeding the power to three-phase coils in the case of the movable coils.

The foregoing first embodiment relates to the case of the three-phase linear motor, but this invention is applicable to a linear motor of N phases (N is an integer of 3 or more). In this case, a stator portion has coil portions of N phases that are supplied with currents having a phase difference from one another. The coil portion of each phase has, as each pair, a first coil wound clockwise and a second coil wound counterclockwise, wherein the coils in each pair are arranged adjacent to each other in the moving direction and connected in series and the plurality of pairs of coils are arrayed in the moving direction. Given that the extending length of the first coil and the second coil is 360 degrees, the coil portion of the second phase is disposed so as to shift in the moving direction by (360/N) degrees with respect to the coil portion of the first phase. The coil portion of the third phase is disposed so as to shift in the moving direction by (360/N) degrees with respect to the coil portion of the second phase. Likewise, the coil portion of the N-th phase is disposed so as to shift in the moving direction by (360/N) degrees with respect to the coil portion of the (N−1)-th phase. Naturally, the coil portions of N phases are layered together. A magnet portion is movably combined with the layered coil portions.

In the foregoing first embodiment, the Hall element 40 is attached at the position away from the center position of the magnet body 31 by an integral multiple of the half wavelength of the resultant magnetic flux, but not limited thereto. That is, the Hall element 40 may be attached at any position as long as the distance from the center position of the magnet body 31 is determined in advance. This also applies to a second embodiment which will be described hereinbelow.

Figure 13:
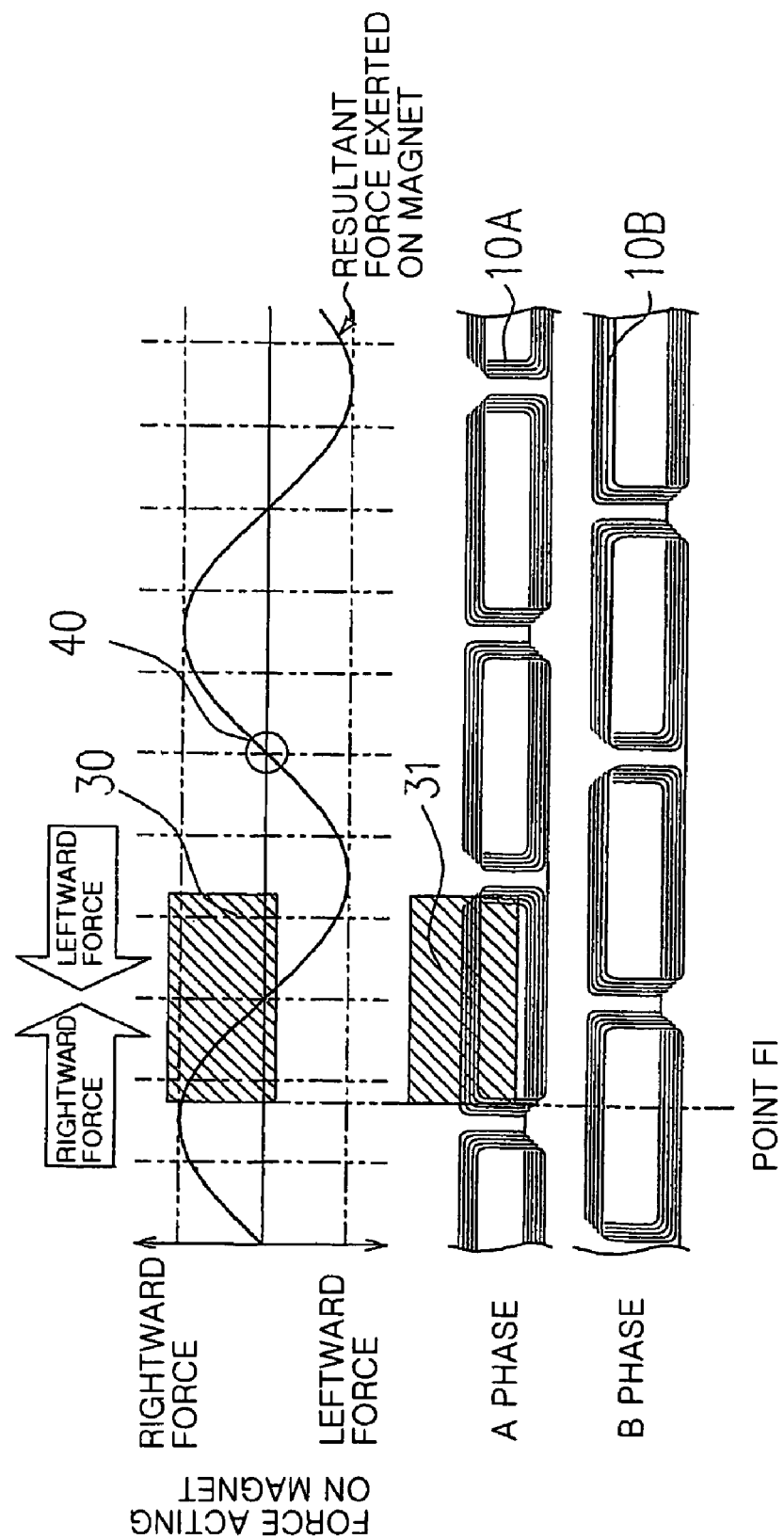
FIG. 13 is a diagram for explaining a relationship between coil portions of two phases and a magnet portion and an attaching position of a Hall element when this invention is applied to a two-phase linear motor.

FIG. 13 shows the second embodiment wherein this invention is applied to a two-phase linear motor. In the two-phase linear motor, its overall structure including a control system is substantially the same as the structure shown in FIG. 1 except that coil portions have two phases and control operation of drive currents by a control unit is a two-phase control. Therefore, description will be made about only the main part of this invention in the linear motor.

In FIG. 13, the two-phase linear motor has an A-phase coil portion 10A and a B-phase coil portion 10B. The A-phase coil portion 10A will be described. The A-phase coil portion 10A has, as each pair, a first coil wound clockwise into a rectangular shape and a second coil wound counterclockwise into a rectangular shape. These coils in each pair are arranged adjacent to each other in a moving direction and connected in series. Further, the plurality of pairs of coils are arrayed in the moving direction and connected in series. The A-phase coil portion 10A is stood upright so that its magnetic flux generating direction becomes perpendicular to the moving direction and parallel to an installation surface. Naturally, the adjacent pairs are also connected in series therebetween. Like in the first embodiment, the extending length of each pair of coils is set to 360 degrees. The B-phase coil portion 10B is formed like the A-phase coil portion 10A and layered to the A-phase coil portion 10A so as to shift from the A-phase coil portion 10A by 90 degrees. Naturally, the layering direction is set to the magnetic flux generating direction, i.e. the direction perpendicular to the moving direction and parallel to the installation surface. A magnet portion 30 may be the same as that in the first embodiment. That is, the magnet portion 30 has a generally inverted-U shape and its extending length in the moving direction is set to half a wavelength of a resultant magnetic flux generated with the layered coil portions. Like in the first embodiment, a Hall element 40 is attached to a slider at its portion spaced forward from the center of a magnet body of the magnet portion 30 in the moving direction by an integral multiple of the half wavelength of the magnetic flux (resultant magnetic flux) of the layered coil portions. As described before, the Hall element 40 is disposed so as to face one of both side surfaces of the layered coil portions with a gap defined therebetween.

Since the operation as the linear motor, the function of the Hall element 40, and the running control operation using a detection signal from the Hall element 40 are substantially the same as those in the first embodiment, description thereof is omitted.

Figure 14:
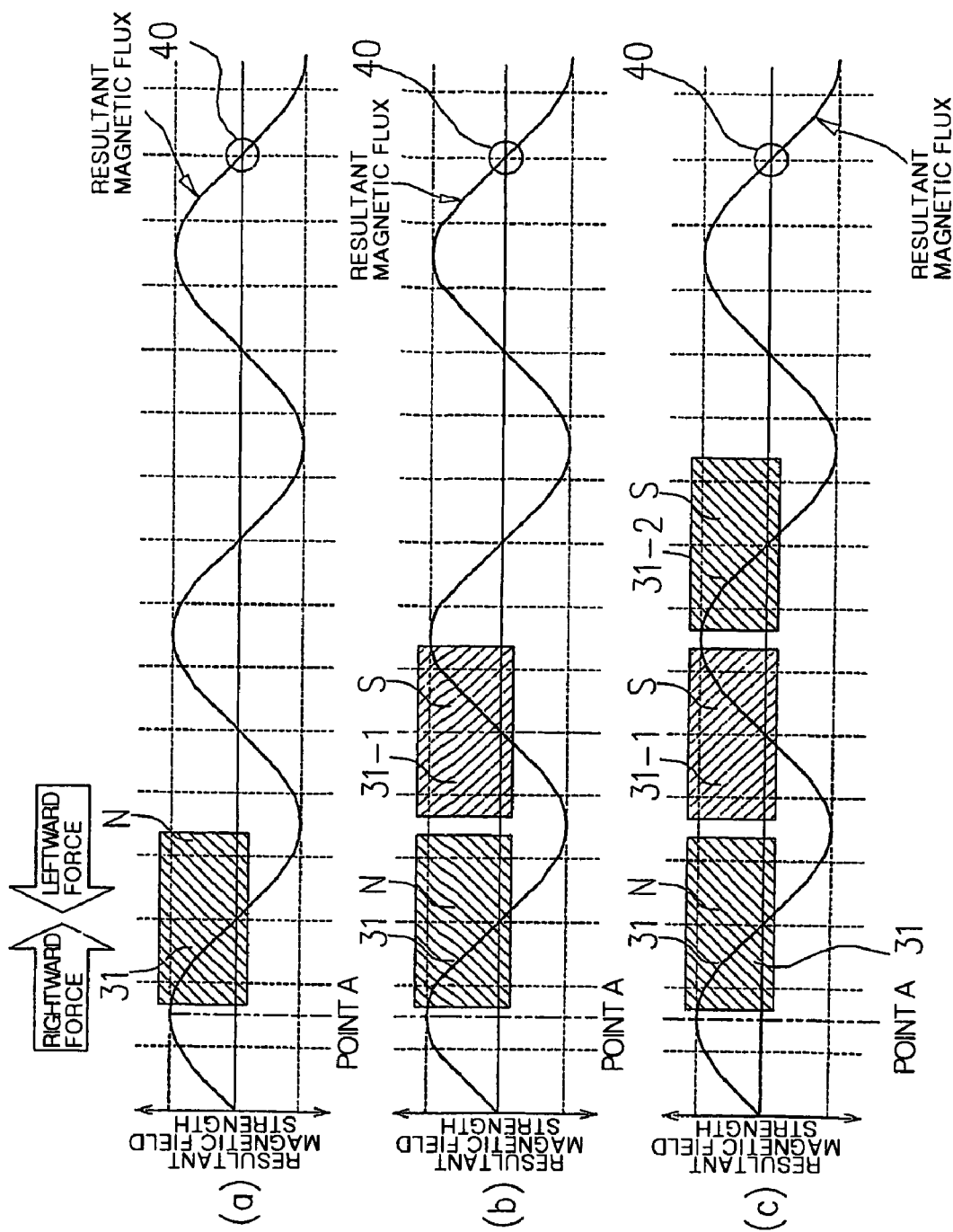
FIG. 14, (a) to FIG. 14, (c) are diagrams for explaining a case where two or more magnets are provided at the magnet portion of the linear motor according to this invention.

In the foregoing first and second embodiments, the description has been made about the case where the length of the magnet portion 30 in the moving direction is set to half the wavelength of the magnetic flux (resultant magnetic flux) generated with the coils and a single magnet is used as the magnet body 31. Instead, as shown in FIG. 14, (a) to 14, (c), two or more magnets may be disposed alternately like N pole-S pole-N pole at a pitch half the wavelength of the resultant magnetic flux. By the use of such a magnet portion, a large driving force can be obtained.

FIG. 14, (a) shows the case where only the magnet body 31 is used, FIG. 14, (b) shows the case where two magnet bodies 31 and 31-1 are used, and FIG. 14, (c) shows the case where three magnet bodies 31, 31-1, and 31-2 are used. Naturally, the length of each of the magnet bodies 31, 31-1, and 31-2 is required to be half or less of the wavelength of the magnetic flux (resultant magnetic flux) generated with the coils.

Figure 15:
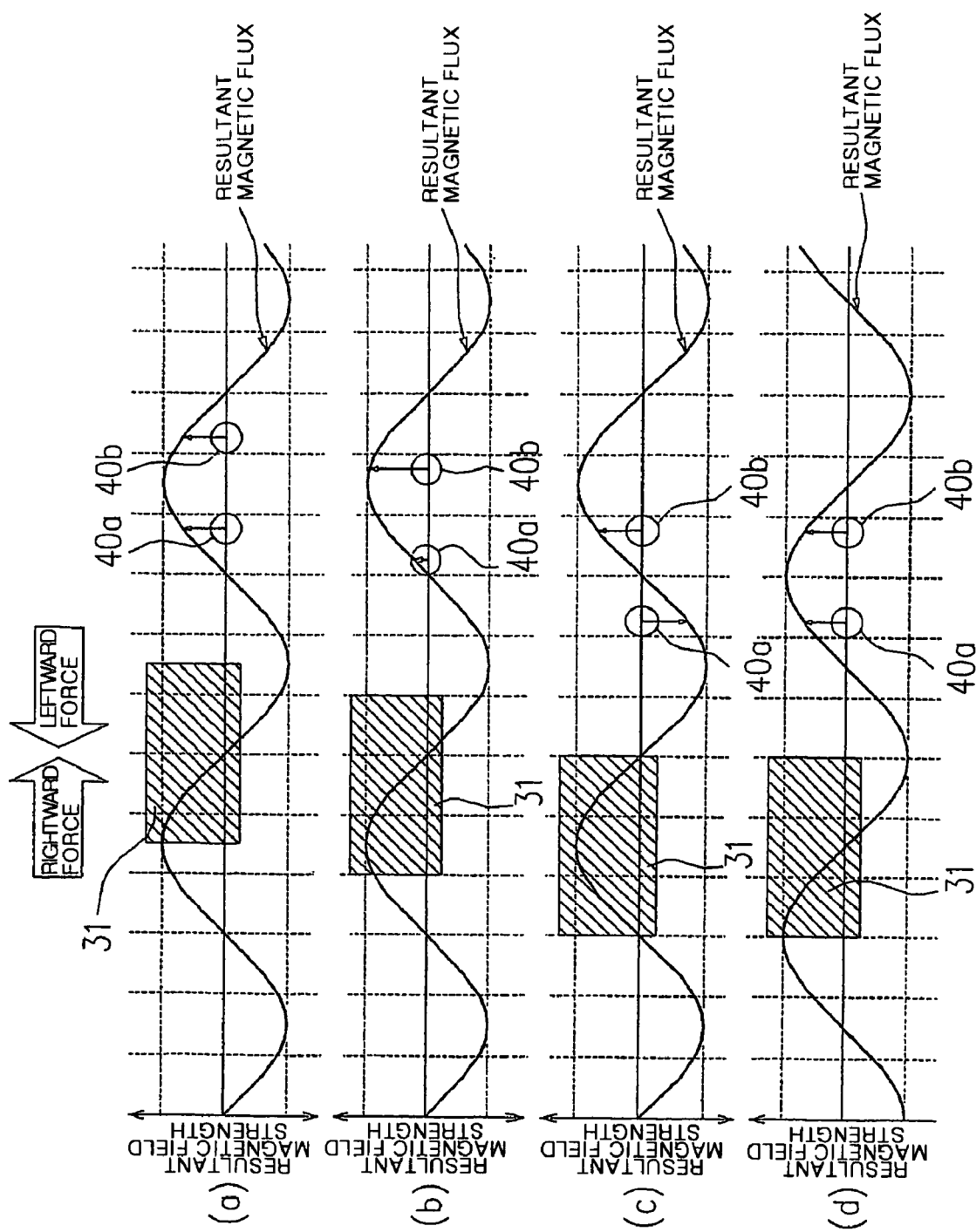
FIG. 15, (a) to FIG. 15, (d) are diagrams for explaining a case where position control is performed by attaching two Hall elements to the linear motor according to this invention.

As shown in FIG. 15, (a) to FIG. 15, (d), the current position of the slider 50 (see FIG. 1) can be accurately detected by providing two Hall elements 40a and 40b at the slider 50. In this case, the Hall element 40a may be called a first Hall element and the Hall element 40b may be called a second Hall element.

In FIG. 15, (a), the Hall element 40b is disposed on a line connecting the center of the magnet body 31 and the Hall element 40a and at a position different from that of the Hall element 40a. In other words, the two Hall elements 40a and 40b are disposed so as to receive the same magnitude of the resultant magnetic flux at the different positions when the center of the magnet body 31 is located at the position of the resultant magnetic field strength being zero. For example, the Hall element 40a is disposed at a position spaced forward from the center of the magnet body 31 by a (225/360) wavelength [$5\pi/4$ (rad)] of the resultant magnetic flux, while the Hall element 40b is disposed at a position spaced forward from the center of the magnet body 31 by a (315/360) wavelength [$7\pi/4$ (rad)] of the resultant magnetic flux. That is, the Hall element 40b is disposed at the position offset from the Hall element 40a by a quarter wavelength [$\pi/2$ (rad)] of the resultant magnetic flux.

By using the two Hall elements 40a and 40b in this manner, the resultant magnetic field strengths can be detected and, by comparing the levels of detection signals of the Hall elements 40a and 40b, the position of the slider 50 can be detected. That is, the amount of delay of the center of the magnet body 31 with respect to the position of the resultant magnetic field strength being zero can be judged more accurately.

According to the detection capability as described above, at the time of magnetic pole detecting operation (also called power factor detecting operation) which is an operation for matching the center of the magnet body 31 with the position of the resultant magnetic field strength being zero at power-on, the magnetic pole detection can be achieved by changing the phases of the coil currents producing the resultant magnetic flux without largely moving the magnet body 31, i.e. the slider 50.

Referring to FIG. 15, (*a*) to FIG. 15, (*d*), it will be described as follows. Without the magnetic pole detecting operation, when the magnet body 31 is located at a position of FIG. 15, (*c*) at power-on, the magnet body 31 receives a rightward force by the resultant magnetic flux so as to be moved like FIG. 15, (*c*)→FIG. 15, (*b*)→FIG. 15, (*a*) and then is stopped at a position of FIG. 15, (*a*) where leftward and rightward forces are balanced.

Figure 16:
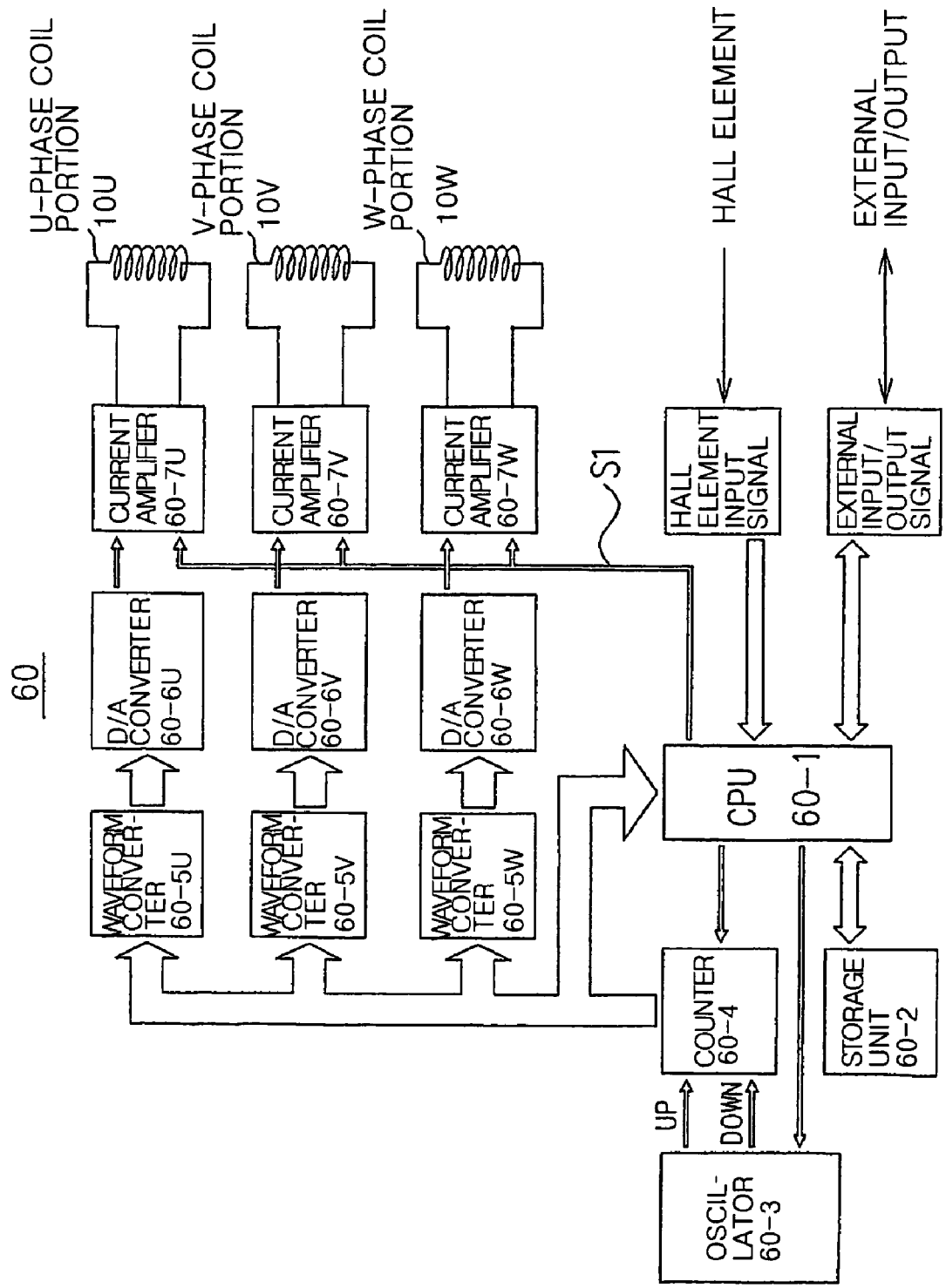
FIG. 16 is a block diagram for explaining a structure of a control unit shown in FIG. 1.

With the magnetic pole detecting operation, when the magnet body 31 is located at the position of FIG. 15, (*c*) at power-on, the later-described control unit 60 in FIG. 16 compares detection signal levels of the Hall elements 40*a* and 40*b* simultaneously upon power-on and calculates a phase shift amount between the magnet body 31 and the resultant magnetic flux. The control unit 60 controls the phase of the resultant magnetic flux depending on the calculated phase shift amount as shown in FIG. 15, (*d*), thereby matching the phase of the resultant magnetic flux with the position of the magnet body 31. This means that the phase adjustment of the resultant magnetic flux can be performed at power-on without moving the magnet body 31.

FIG. 16 shows an internal structure of the control unit 60 for the three-phase linear motor as described before. This control unit 60 is applicable to any of the case where only the single Hall element is provided like in FIG. 10, the case where the two Hall elements are provided like in FIG. 15, and the case where three or more Hall elements are provided.

The control unit 60 comprises a CPU 60-1, a storage unit 60-2, an oscillator 60-3, and a counter 60-4 for counting output pulses of the oscillator 60-3. The control unit 60 further comprises a waveform converter 60-5U, a D/A converter 60-6U, and a current amplifier 60-7U as a drive system for the U-phase coil portion 10U. The control unit 60 further comprises a waveform converter 60-5V, a D/A converter 60-6V, and a current amplifier 60-7V as a drive system for the V-phase coil portion 10V, and a waveform converter 60-5W, a D/A converter 60-6W, and a current amplifier 60-7W as a drive system for the W-phase coil portion 10W.

In FIG. 16, the oscillator 60-3 is shown as an independent component in order to facilitate understanding of the function of the control unit 60. However, the function of the oscillator 60-3 is actually realized by the CPU 60-1. That is, the CPU 60-1 has the clock pulse generating function. Naturally, it is needless to say that a well-known pulse generator may be provided separately from the CPU 60-1.

The CPU 60-1 is given initial data from a non-illustrated set value input portion at power-on. The initial data is fixed data unique to this linear motor, for example, data necessary for carrying out the magnetic pole detecting (power factor detecting) operation that measures the resultant magnetic field strengths by the Hall elements and matches the phase of the resultant magnetic field generated with the layered coil portions with the position of the magnet body 31, the origin search operation for obtaining origin position data by matching the slider 50 with an origin sensor (not shown), or the like.

The CPU 60-1 is further given variable data from the set value input portion before the start of running of the slider 50. The variable data is data that can be changed according to necessity, for example, running speed data of the slider 50, stop position (target position) data thereof, or the like. In response to receipt of the foregoing fixed data or variable data, the CPU 60-1 stores it into the storage unit 60-2.

When starting the running control of the slider 50, the CPU 60-1 reads the foregoing various data from the storage unit 60-2, determines an oscillation frequency of the oscillator 60-3 based on the read data, and causes the oscillator 60-3 to oscillate. Output pulses from the oscillator 60-3 are counted by the counter 60-4 and count values are output to the waveform converters 60-5U, 60-5V, and 60-5W. Based on the count values of the counter 60-4, the waveform converters 60-5U, 60-5V, and 60-5W respectively produce waveform data defining current waveforms to be fed to the U-phase coil portion 10U, the V-phase coil portion 10V, and the W-phase coil portion 10W and output them as digital data. These digital data are converted into analog currents by the D/A converters 60-6U, 60-6V, and 60-6W. The current amplifiers 60-7U, 60-7V, and 60-7W respectively amplify the analog currents from the D/A converters 60-6U, 60-6V, and 60-6W and feed U-phase, V-phase, and W-phase currents having the waveforms corresponding to the foregoing waveform data to the U-phase coil portion 10U, the V-phase coil portion 10V, and the W-phase coil portion 10W.

Further, the CPU 60-1 outputs, according to necessity, a control signal S1 for amplitude control or phase control of the coil currents to the current amplifiers 60-7U, 60-7V, and 60-7W.

Description will be made about a control that is implemented when detection signals of the Hall elements 40*a* and 40*b* are input into the CPU 60-1, which is as follows. As described with reference to FIG. 15, (*a*), when the slider 50 (FIG. 1), i.e. the magnet body 31, is not delayed, the levels of the detection signals of the Hall elements 40*a* and 40*b* are both positive and equal in value. Accordingly, if the levels of the detection signals of the Hall elements 40*a* and 40*b* are both positive and equal in value, the CPU 60-1 judges that the slider 50 is moving synchronously with the resultant magnetic flux, that is, no delay is generated.

However, when the magnet body 31 starts to be delayed as shown in FIG. 15, (*b*), the level of the detection signal of the Hall element 40*a* starts to decrease, while the level of the detection signal of the Hall element 40*b* starts to increase. That is, FIG. 15, (*b*) shows the case where a large load is applied to the slider 50 so that the magnet body 31 is delayed. Since the magnet body 31 moves along with the slider 50, the delay of the slider 50 and the delay of the magnet body 31 are equal to each other. Accordingly, description will be made hereinbelow assuming that an object of the delay is the magnet body 31. When the magnet body 31 is delayed from the synchronized state (normal state), the CPU 60-1 implements the following control operation.

Based on the detection signals from the Hall elements 40*a* and 40*b*, the CPU 60-1 detects the position of the magnet body 31 (slider 50) and the currents flowing in the respective coil portions. When the magnet body 31 is delayed, the CPU 60-1 outputs a control signal S1 indicative of an increase in current amplitude to the current amplifiers 60-7U, 60-7V, and 60-7W. As a result, the amplitude of the currents flowing in the U-phase coil portion 10U, the V-phase coil portion 10V, and the W-phase coil portion 10W is increased. Accordingly, the strength of the resultant magnetic field generated with the layered coil portions increases so that a thrust is exerted on the magnet body 31 such that its center is located at the position of the resultant magnetic field strength being zero.

However, when, even by that, the magnet body 31 does not follow the resultant magnetic flux due to the large load applied to the slider 50, the magnet body 31 is, as shown in FIG. 15, (c), delayed from the synchronized state of FIG. 15, (a) by a quarter wavelength [π/2 (rad)] of the resultant magnetic flux. In this case, the levels of the detection signals of the Hall elements 40a and 40b are equal in value while the polarities thereof are different. That is, the level of the detection signal of the Hall element 40a is negative, while the level of the detection signal of the Hall element 40b is positive. This means that the delay of the magnet body 31 is less than the quarter wavelength [π/2 (rad)] of the resultant magnetic flux from the state where the levels of the detection signals of the Hall elements 40a and 40b are positive and equal in value to the state where the levels of the detection signals of the Hall elements 40a and 40b are equal in value while the polarities thereof are different. From the correlation about the levels and polarities of the detection signals of the Hall elements 40a and 40b, the CPU 60-1 performs the foregoing judgment. Further, from the foregoing correlation, the CPU 60-1 can calculate a degree of the delay of the magnet body 31 as a distance. The distance in this case represents a distance offset from the position where the magnet body 31 should be located in the synchronized state.

When the delayed state of FIG. 15, (c) is reached, the CPU 60-1, based on the detection signals from the Hall elements 40a and 40b, outputs a command to the oscillator 60-3 to reduce the oscillation frequency. As a result, the frequency of the currents flowing in the U-phase coil portion 10U, the V-phase coil portion 10V, and the W-phase coil portion 10W is reduced so that the proceeding speed of the resultant magnetic flux (the changing speed of the resultant magnetic flux) is slowed, and therefore, the slider 50 can easily follow the resultant magnetic flux.

However, when, even by that, the moving magnet body 31 is delayed, the CPU 60-1 first stops the oscillator 60-3. In this case, the counter 60-4 continues to hold a count value at the time of stopping of the oscillator 60-3. Then, if the delay further continues, the count value of the counter 60-4 is reduced. In this case, the currents flowing in the U-phase coil portion 10U, the V-phase coil portion 10V, and the W-phase coil portion 10W are reversed like W phase→V phase→U phase→W phase→V phase . . . as compared with when the count value of the counter 60-4 increases up to then, so that the proceeding direction of the resultant magnetic flux is also reversed and, therefore, referring to FIG. 15, the resultant magnetic flux proceeds in the direction from FIG. 15, (c) to FIG. 15, (d). In this case, the waveform of the resultant magnetic flux moving from right to left in FIG. 15 with the lapse of time is moved backward from the waveform of FIG. 15, (c) to that of FIG. 15, (d), so that it is possible to eliminate the delay of the magnet body 31.

In the foregoing manner, the CPU 60-1 implements the control such that the center of the magnet body 31 is not delayed by the quarter wavelength or more of the resultant magnetic flux from the synchronized state where it is located at the position of the resultant magnetic field strength being zero. That is, the magnet body 31 may be delayed from the synchronized state by close to the quarter wavelength of the resultant magnetic flux, but is never subjected to loss of synchronism.

The foregoing description relates to the case where the magnet body 31 is delayed from the normal state (synchronized state) due to the load. However, also in the case of forcibly moving forward the stopped magnet body 31, the currents of the U-phase coil portion 10U, the V-phase coil portion 10V, and the W-phase coil portion 10W are increased while the magnet body 31 proceeds by up to the quarter wavelength of the resultant magnetic flux from the normal state, but, when the magnet body 31 proceeds by the quarter wavelength or more of the resultant magnetic flux from the normal state, the CPU 60-1 increases the count value of the counter 60-4 to advance (rightward in FIG. 15) the waveform of the resultant magnetic flux.

The slider 50 starts running from an origin position corresponding to a position of the origin sensor. As described before, the running speed of the slider 50 after starting the running and the stop position (target position), i.e. a moving distance from the origin position, are input into the CPU 60-1 as variable data from the external set value input portion and stored in the storage unit 60-2. When starting the running, the CPU 60-1 reads the foregoing variable data from the storage unit 60-2. The CPU 60-1 calculates, based on the read variable data, an oscillation frequency F1 of the oscillator 60-3 and the total number P1 of output pulses thereof necessary for realizing the foregoing running speed and moving distance and, based on the calculated values, controls the oscillator 60-2. In this event, the CPU 60-1 also calculates a moving distance L1 of the slider 50 per period of the output pulse of the oscillator 60-3 in order to calculate the total number P1 of the output pulses. The CPU 60-1 holds these calculated values.

The CPU 60-1 multiplies the count value of the counter 60-4 by the foregoing moving distance L1, thereby calculating a current position of the slider 50. Further, the CPU 60-1 compares the total number P1 of the output pulses and the count value of the counter 60-4 and controls the oscillator 60-2 to continue oscillation until a difference therebetween becomes zero. When the difference between the total number P1 of the output pulses and the count value of the counter 60-4 becomes zero, the CPU 60-1 stops the oscillation of the oscillator 60-2, judging that the slider 50 has reached the target position.

When the oscillation of the oscillator 60-2 is stopped, respective current values flowing immediately before the stoppage continue to be supplied to the coil portions of the respective phases. Thus, the waveform of the resultant magnetic flux does not move with the lapse of time so that the magnet body 31 (slider 50) is held at a constant position.

As clear from the foregoing description, the current position of the slider 50 is calculated by multiplying the count value of the counter 60-4 by the moving distance L1. Herein, when, as shown in FIG. 15, (a), the magnet body 31 deviates by the quarter wavelength or more of the resultant magnetic flux with respect to the stable stop position of the resultant magnetic flux, this is detected by the Hall element 40. In this case, the CPU 60-1 performs control so as to eliminate deviation of the Hall element 40 by increasing or decreasing a numerical value of the counter 60-4. Further, the CPU 60-1 can accurately detect the position of the slider 50 (magnet body 31) by monitoring the count value of the counter 60-4. Even with the single Hall element, there is obtained the effect similar to that with the two Hall elements. However, since the position of the magnet body 31 can be detected more minutely in the case of the two Hall elements, the count value of the counter 60-4 can be corrected more quickly so that the position of the magnet body 31 can be precisely controlled. The number of Hall elements is not limited to one or two, but three or more Hall elements may be provided.

When the three or more sensors are provided, since the position can be calculated while excluding position information including error, the magnet 31 can be controlled more precisely.

INDUSTRIAL APPLICABILITY

A linear motor according to this invention can maintain accurate running control only by combining a single magnetoelectric conversion element at a movable portion. On the other hand, since an accurate position of a magnet body can be detected by combining two or more magnetoelectric conversion elements, even when the magnet body is not located at power-on at a position where the synchronized state is achieved, it is possible to perform magnetic pole detecting (power factor detecting) operation control that can avoid movement of the magnet body and also possible to omit an expensive linear scale for position detection, thus leading to a large reduction in cost. The linear motor according to this invention is suitable for a conveying apparatus that conveys works such as semiconductor substrates or liquid crystal substrates.

The invention claimed is:

1. A linear motor comprising a stator portion having coil portions fixedly arranged in series in a moving direction and a mover portion having one or more magnets and combined so as to be movable in said moving direction due to interaction with magnetic flux generated with said coil portions, said linear motor characterized in that said stator portion has, as said coil portions, coil portions of N phases (N is an integer of 3 or more) to be fed with currents having a phase difference from one another, the coil portion of each phase has, as each pair, a first coil wound clockwise and a second coil wound counter-clockwise, wherein said first and second coils in each pair are arranged adjacent to each other in the moving direction and connected in series and the plurality of pairs of said first and second coils are arrayed in the moving direction, and further, an extending length of said first coil and said second coil is set to 360 degrees, wherein the coil portion of the second phase is disposed so as to shift in the moving direction by (360/N) degrees with respect to the coil portion of the first phase, the coil portion of the third phase is disposed so as to shift in the moving direction by (360/N) degrees with respect to the coil portion of the second phase, and the coil portion of the N-th phase is disposed so as to shift in the moving direction by (360/N) degrees with respect to the coil portion of the (N−1)-th phase, said coil portions of the N phases being disposed so as to be layered together, said magnet is combined with said coil portions of the N phases and a length of said magnet in the moving direction is set to half or less of a wavelength of magnetic flux generated with said coils, and a first magnetoelectric conversion element is attached to said mover portion at a position away from the center of said magnet in the moving direction by a predetermined distance and the currents to said respective coil portions are controlled based on an output of said first magnetoelectric conversion element.

2. A linear motor comprising a stator portion having coil portions fixedly arranged in series in a moving direction and a mover portion having one or more magnets and combined so as to be movable in said moving direction due to interaction with magnetic flux generated with said coil portions, said linear motor characterized in that said stator portion has, as said coil portions, an A-phase coil portion and a B-phase coil portion to be fed with currents having a phase difference of 90 degrees, the coil portion of each phase has, as each pair, a first coil wound clockwise and a second coil wound counterclockwise, wherein said first and second coils in each pair are arranged adjacent to each other in the moving direction and connected in series and the plurality of pairs of said first and second coils are arrayed in the moving direction, and further, an extending length of said first coil and said second coil is set to 360 degrees, wherein said B-phase coil portion is disposed so as to shift in the moving direction by 90 degrees with respect to said A-phase coil portion and to be layered to said A-phase coil portion, said magnet is combined with said A-phase and B-phase coil portions and a length of said magnet in the moving direction is set to half or less of a wavelength of magnetic flux generated with said coils, and a first magnetoelectric conversion element is attached to said mover portion at a position away from the center of said magnet in the moving direction by a predetermined distance and the currents to said respective coil portions are controlled based on an output of said first magnetoelectric conversion element.

3. A linear motor according to claim 1, characterized in that a detection signal of said first magnetoelectric conversion element is transmitted to a receiver provided on a stationary side in the form of a radio signal or an optical signal.

4. A linear motor according to claim 1, characterized in that said predetermined distance is set to a value of an integral multiple of a half wavelength of the magnetic flux generated with said coils.

5. A linear motor according to claim 1, characterized in that at least one second magnetoelectric conversion element is further attached to said mover portion on a line connecting the center of said magnet and said first magnetoelectric conversion element and at a position different from that of said first magnetoelectric conversion element, a distance between said first magnetoelectric conversion element and said second magnetoelectric conversion element is set to a value of a quarter wavelength of the magnetic flux generated with said coils, detection signals of said first magnetoelectric conversion element and said second magnetoelectric conversion element are transmitted to a receiver provided on a stationary side in the form of radio signals or optical signals, and a control unit is provided that performs position control of said mover portion in response to the detection signals of said first magnetoelectric conversion element and said second magnetoelectric conversion element received at said receiver.

6. A linear motor according to claim 2, characterized in that a detection signal of said first magnetoelectric conversion element is transmitted to a receiver provided on a stationary side in the form of a radio signal or an optical signal.

7. A linear motor according to claim 2, characterized in that said predetermined distance is set to a value of an integral multiple of a half wavelength of the magnetic flux generated with said coils.

8. A linear motor according to claim 2, characterized in that at least one second magnetoelectric conversion element is further attached to said mover portion on a line connecting the center of said magnet and said first magnetoelectric conversion element and at a position different from that of said first magnetoelectric conversion element, a distance between said first magnetoelectric conversion element and said second magnetoelectric conversion element is set to a value of a quarter wavelength of the magnetic flux generated with said coils, detection signals of said first magnetoelectric conversion element and said second magnetoelectric conversion element are transmitted to a receiver provided on a stationary side in the form of radio signals or optical signals, and a control unit is provided that performs position control of said mover portion in response to the detection signals of said first magnetoelectric conversion element and said second magnetoelectric conversion element received at said receiver.

* * * * *